US012564187B2

(12) United States Patent
Judson et al.

(10) Patent No.: US 12,564,187 B2
(45) Date of Patent: Mar. 3, 2026

(54) APPARATUS FOR TISSUE TRANSPORT AND PRESERVATION

(71) Applicant: Paragonix Technologies, Inc., Waltham, MA (US)

(72) Inventors: Jared Alden Judson, Medford, MA (US); Lisa Maria Anderson, Cambridge, MA (US); William Edelman, Sharon, MA (US)

(73) Assignee: Paragonix Technologies, Inc., Waltham, MA (US)

( * ) Notice: Subject to any disclaimer, the term of this patent is extended or adjusted under 35 U.S.C. 154(b) by 0 days.

(21) Appl. No.: 19/248,101

(22) Filed: Jun. 24, 2025

(65) Prior Publication Data

US 2025/0344691 A1 Nov. 13, 2025

Related U.S. Application Data

(60) Continuation of application No. 17/468,142, filed on Sep. 7, 2021, now abandoned, which is a continuation-in-part of application No. 17/378,233, filed on Jul. 16, 2021, now Pat. No. 11,659,834, which is a division of application No. 16/002,795, filed on Jun. 7, 2018, now Pat. No. 11,166,452.

(Continued)

(51) Int. Cl.
*A01N 1/142* (2025.01)
*A01N 1/143* (2025.01)
*A01N 1/148* (2025.01)

(52) U.S. Cl.
CPC ............. *A01N 1/142* (2025.01); *A01N 1/143* (2025.01); *A01N 1/148* (2025.01)

(58) Field of Classification Search
None
See application file for complete search history.

(56) References Cited

U.S. PATENT DOCUMENTS

| | | | |
|---|---|---|---|
| 3,323,872 A | 6/1967 | Scott | |
| 3,398,743 A | 8/1968 | Shalit | |

(Continued)

FOREIGN PATENT DOCUMENTS

| | | |
|---|---|---|
| CA | 2980782 | 11/2007 |
| CA | 2722615 | 10/2009 |

(Continued)

OTHER PUBLICATIONS

Chi et al., "The Development of a portable ECG monitor based on DSP", Physics Procedia, vol. 33:765-774 (2012).

(Continued)

*Primary Examiner* — Holly Kipouros
*Assistant Examiner* — Ashley Lopezlira
(74) *Attorney, Agent, or Firm* — Knobbe Martens Olson & Bear, LLP

(57) ABSTRACT

Systems and methods of the invention generally relate to prolonging viability of bodily tissue, especially lung tissue, through the use of an expandable accumulator to maintain a constant pressure within the lumen of the organ even during external pressure fluctuations due to, for example, flight. Systems and methods may include prolonging donor organ viability in storage through the use of an organ container that mimics the geometry and orientation of the organ in vivo.

15 Claims, 25 Drawing Sheets

Related U.S. Application Data

(60) Provisional application No. 62/650,610, filed on Mar. 30, 2018, provisional application No. 62/584,330, filed on Nov. 10, 2017, provisional application No. 62/516,581, filed on Jun. 7, 2017.

(56)                    References Cited

U.S. PATENT DOCUMENTS

| | | | |
|---|---|---|---|
| 3,607,646 | A | 9/1971 | de Roissart |
| 3,935,065 | A | 1/1976 | Doerig |
| 4,336,248 | A | 6/1982 | Bonhard et al. |
| 4,502,295 | A | 3/1985 | Toldeo-Pereyra |
| 4,575,498 | A | 3/1986 | Holmes et al. |
| 4,643,713 | A | 2/1987 | Viitala |
| 4,723,974 | A | 2/1988 | Ammerman |
| 4,931,333 | A | 6/1990 | Henry |
| 4,952,409 | A | 8/1990 | Bando et al. |
| 4,976,708 | A | 12/1990 | Oshiyama |
| 5,051,352 | A | 9/1991 | Martindale et al. |
| 5,066,578 | A | 11/1991 | Wikman-Coffelt |
| 5,093,969 | A | 3/1992 | McGuire |
| 5,133,470 | A | 7/1992 | Abrams et al. |
| 5,141,847 | A | 8/1992 | Sugimachi et al. |
| 5,149,321 | A | 9/1992 | Klatz et al. |
| 5,157,930 | A | 10/1992 | McGhee et al. |
| 5,186,431 | A | 2/1993 | Tamari |
| 5,234,405 | A | 8/1993 | Klatz et al. |
| RE34,387 | E | 9/1993 | Holmes et al. |
| 5,252,537 | A | 10/1993 | De Winter-Scailteur |
| 5,285,657 | A | 2/1994 | Bacchi et al. |
| 5,306,711 | A | 4/1994 | Andrews |
| D347,894 | S | 6/1994 | Hansen et al. |
| 5,320,846 | A | 6/1994 | Bistrian et al. |
| 5,326,706 | A | 7/1994 | Yland et al. |
| 5,356,771 | A | 10/1994 | O'Dell |
| 5,362,622 | A | 11/1994 | O'Dell et al. |
| 5,385,821 | A | 1/1995 | O'Dell et al. |
| 5,395,314 | A | 3/1995 | Klatz et al. |
| 5,434,045 | A | 7/1995 | Jost |
| 5,435,142 | A | 7/1995 | Silber |
| 5,570,588 | A | 11/1996 | Lowe |
| 5,584,804 | A | 12/1996 | Klatz et al. |
| 5,586,438 | A | 12/1996 | Fahy |
| 5,599,659 | A | 2/1997 | Brasile et al. |
| 5,601,972 | A | 2/1997 | Meryman |
| 5,629,145 | A | 5/1997 | Meryman |
| 5,643,712 | A | 7/1997 | Brasile |
| 5,656,154 | A | 8/1997 | Meryman |
| 5,696,152 | A | 12/1997 | Southard |
| 5,699,793 | A | 12/1997 | Brasile |
| 5,702,881 | A | 12/1997 | Brasile et al. |
| 5,707,971 | A | 1/1998 | Fahy |
| 5,709,654 | A | 1/1998 | Klatz et al. |
| 5,712,084 | A | 1/1998 | Osgood |
| 5,716,378 | A | 2/1998 | Minten |
| 5,752,929 | A | 5/1998 | Klatz et al. |
| 5,827,222 | A | 10/1998 | Klatz et al. |
| 5,843,024 | A | 12/1998 | Brasile |
| 5,916,800 | A | 6/1999 | Elizondo et al. |
| 5,922,598 | A | 7/1999 | Mintchev |
| 5,963,335 | A | 10/1999 | Boutelle |
| 5,965,433 | A | 10/1999 | Gardetto et al. |
| 6,014,864 | A | 1/2000 | Owen |
| 6,020,575 | A | 2/2000 | Nagle et al. |
| 6,024,698 | A | 2/2000 | Brasile |
| 6,042,559 | A | 3/2000 | Dobak, III |
| 6,046,046 | A | 4/2000 | Hassanein |
| 6,060,232 | A | 5/2000 | Von Baeyer et al. |
| 6,100,082 | A | 8/2000 | Hassanein |
| 6,174,719 | B1 | 1/2001 | Elizondo et al. |
| 6,194,137 | B1 | 2/2001 | Khirabadi et al. |
| 6,209,343 | B1 | 4/2001 | Owen |
| 6,241,945 | B1 | 6/2001 | Owen |
| 6,260,360 | B1 | 7/2001 | Wheeler |
| 6,280,925 | B1 | 8/2001 | Brockbank |
| 6,303,388 | B1 | 10/2001 | Fahy |
| D453,828 | S | 2/2002 | Brassil et al. |
| 6,375,613 | B1 | 4/2002 | Brasile |
| 6,381,981 | B1 | 5/2002 | Yaddgo et al. |
| 6,406,839 | B1 | 6/2002 | Segall et al. |
| 6,413,713 | B1 | 7/2002 | Serebrennikov |
| 6,475,716 | B1 | 11/2002 | Seki |
| 6,485,450 | B1 | 11/2002 | Owen |
| 6,492,103 | B1 | 12/2002 | Taylor |
| D468,436 | S | 1/2003 | Brassil et al. |
| D470,594 | S | 2/2003 | Brassil et al. |
| 6,569,615 | B1 | 5/2003 | Thatte et al. |
| 6,582,953 | B2 | 6/2003 | Brasile |
| 6,596,531 | B2 | 7/2003 | Campbell et al. |
| 6,642,019 | B1 | 11/2003 | Anderson et al. |
| 6,642,045 | B1 | 11/2003 | Brasile |
| 6,656,380 | B2 | 12/2003 | Wood et al. |
| 6,673,008 | B1 | 1/2004 | Thompson et al. |
| 6,673,594 | B1 | 1/2004 | Owen et al. |
| 6,677,150 | B2 | 1/2004 | Alford et al. |
| 6,699,231 | B1 | 3/2004 | Sterman et al. |
| 6,736,836 | B2 | 5/2004 | Montgomery |
| 6,740,484 | B1 | 5/2004 | Khirabadi et al. |
| 6,773,877 | B2 | 8/2004 | Fahy |
| 6,794,124 | B2 | 9/2004 | Steen |
| 6,794,182 | B2 | 9/2004 | Wolf, Jr. |
| 6,905,871 | B1 | 6/2005 | Doorschodt et al. |
| 6,924,267 | B2 | 8/2005 | Daemen et al. |
| 6,948,334 | B1 | 9/2005 | Challenger |
| 6,953,655 | B1 | 10/2005 | Hassanein et al. |
| 6,977,140 | B1 | 12/2005 | Owen et al. |
| 6,994,954 | B2 | 2/2006 | Taylor |
| 6,997,688 | B1 | 2/2006 | Klein et al. |
| 7,005,253 | B2 | 2/2006 | Polyak et al. |
| 7,008,535 | B1 | 3/2006 | Spears et al. |
| 7,029,839 | B2 | 4/2006 | Toledo-Pereyra et al. |
| D527,225 | S | 8/2006 | Krieger et al. |
| D531,319 | S | 10/2006 | Schein et al. |
| D531,320 | S | 10/2006 | Garland et al. |
| 7,157,222 | B2 | 1/2007 | Khirabadi et al. |
| 7,176,015 | B2 | 2/2007 | Alford et al. |
| 7,240,513 | B1 | 7/2007 | Conforti |
| 7,270,946 | B2 | 9/2007 | Brockbank et al. |
| 7,294,278 | B2 | 11/2007 | Spears et al. |
| 7,316,922 | B2 | 1/2008 | Streeter |
| 7,326,564 | B2 | 2/2008 | Lundell et al. |
| 7,361,365 | B2 | 4/2008 | Birkett et al. |
| 7,410,474 | B1 | 8/2008 | Friend et al. |
| D576,488 | S | 9/2008 | Miota et al. |
| 7,504,201 | B2 | 3/2009 | Taylor et al. |
| 7,572,622 | B2 | 8/2009 | Hassanein et al. |
| 7,651,835 | B2 | 1/2010 | Hassanein et al. |
| 7,678,563 | B2 | 3/2010 | Wright et al. |
| 7,691,622 | B2 | 4/2010 | Garland et al. |
| 7,749,693 | B2 | 7/2010 | Brassil et al. |
| 7,811,808 | B2 | 10/2010 | van der Plaats et al. |
| 7,824,848 | B2 | 11/2010 | Owen et al. |
| D630,318 | S | 1/2011 | Goodwin |
| 7,897,327 | B2 | 3/2011 | Millis et al. |
| 8,097,449 | B2 | 1/2012 | Garland et al. |
| 8,152,367 | B2 | 4/2012 | Roberts et al. |
| D664,261 | S | 7/2012 | Kravitz et al. |
| 8,268,547 | B2 | 9/2012 | Owen et al. |
| 8,268,612 | B2 | 9/2012 | Owen et al. |
| 8,304,181 | B2 | 11/2012 | Hassanein et al. |
| D672,466 | S | 12/2012 | Kravitz et al. |
| 8,323,954 | B2 | 12/2012 | Kravitz et al. |
| 8,361,091 | B2 | 1/2013 | Schein et al. |
| 8,420,380 | B2 | 4/2013 | Fishman et al. |
| 8,465,970 | B2 | 6/2013 | Hassanein et al. |
| D692,159 | S | 10/2013 | Judson et al. |
| D692,160 | S | 10/2013 | Judson et al. |
| 8,613,202 | B2 | 12/2013 | Williams |
| D697,224 | S | 1/2014 | Judson et al. |
| 8,685,709 | B2 | 4/2014 | Bunegin et al. |
| 8,785,116 | B2 | 7/2014 | Anderson et al. |
| 8,802,425 | B2 | 8/2014 | Ferrera |
| D713,972 | S | 9/2014 | Judson et al. |
| D714,461 | S | 9/2014 | Judson et al. |

(56)  References Cited

U.S. PATENT DOCUMENTS

| | | | |
|---|---|---|---|
| D714,462 S | 9/2014 | Judson et al. | |
| 8,828,034 B2 | 9/2014 | Kravitz et al. | |
| 8,828,710 B2 | 9/2014 | Anderson et al. | |
| 8,835,158 B2 | 9/2014 | Judson et al. | |
| D727,492 S | 4/2015 | Scampoli | |
| D734,868 S | 7/2015 | Gilboa | |
| 9,089,126 B2 | 7/2015 | Faulkner et al. | |
| 9,155,297 B2 | 10/2015 | Anderson et al. | |
| 9,247,728 B2 | 2/2016 | Fishman et al. | |
| 9,253,976 B2 | 2/2016 | Anderson et al. | |
| 9,259,562 B2 | 2/2016 | Steinman et al. | |
| 9,357,767 B2 | 6/2016 | Steinman et al. | |
| 9,426,979 B2 | 8/2016 | Anderson et al. | |
| D765,874 S | 9/2016 | Judson et al. | |
| 9,560,846 B2 | 2/2017 | Anderson et al. | |
| D787,696 S | 5/2017 | Schmieta et al. | |
| D791,939 S | 7/2017 | Turturro et al. | |
| 9,867,368 B2 | 1/2018 | Anderson et al. | |
| 9,910,000 B2 | 3/2018 | Lynam et al. | |
| 9,936,689 B2 | 4/2018 | Anderson et al. | |
| D819,223 S | 5/2018 | Judson et al. | |
| 10,076,112 B2 | 9/2018 | Hassanein et al. | |
| 10,085,441 B2 | 10/2018 | Steinman et al. | |
| D861,161 S | 9/2019 | Schuessler | |
| D882,077 S | 4/2020 | Schmitt | |
| D884,887 S | 5/2020 | Kangastupa | |
| D901,680 S | 11/2020 | Guala | |
| 10,918,102 B2 | 2/2021 | Uygun et al. | |
| D912,245 S | 3/2021 | Grudo et al. | |
| 11,089,775 B2 | 8/2021 | Anderson et al. | |
| 11,166,452 B2 | 11/2021 | Judson et al. | |
| 11,178,866 B2 | 11/2021 | Anderson et al. | |
| D963,194 S | 9/2022 | Bixon et al. | |
| 11,472,625 B2 | 10/2022 | Mirzaee Kakhki | |
| 11,528,903 B1 | 12/2022 | He et al. | |
| D975,273 S | 1/2023 | Theriot | |
| 11,576,371 B2 | 2/2023 | Legallais et al. | |
| 11,632,951 B2 | 4/2023 | Collette et al. | |
| 11,659,834 B2 | 5/2023 | Judson et al. | |
| D999,370 S | 9/2023 | Wade et al. | |
| D1,002,868 S | 10/2023 | Bixon et al. | |
| D1,003,434 S | 10/2023 | Fangrow | |
| 11,785,938 B2 | 10/2023 | Clavien et al. | |
| D1,016,251 S | 2/2024 | Castriotta et al. | |
| D1,031,028 S | 6/2024 | Bornhoft et al. | |
| 12,035,708 B2 | 7/2024 | Anderson et al. | |
| 12,052,985 B2 | 8/2024 | Anderson et al. | |
| 12,070,029 B2 | 8/2024 | Collette et al. | |
| 12,096,765 B1 | 9/2024 | Anderson et al. | |
| 12,121,023 B1 | 10/2024 | Anderson et al. | |
| 12,161,110 B2 | 12/2024 | Collette et al. | |
| 12,178,206 B2 | 12/2024 | Collette et al. | |
| 12,245,585 B2 | 3/2025 | Judson et al. | |
| 12,245,586 B2 | 3/2025 | Anderson et al. | |
| 12,279,610 B2 | 4/2025 | Anderson et al. | |
| 12,310,357 B2 | 5/2025 | Collette et al. | |
| 12,342,810 B2 | 7/2025 | Anderson et al. | |
| 12,357,533 B2 | 7/2025 | Bulka et al. | |
| 12,369,576 B2 | 7/2025 | Anderson et al. | |
| D1,087,382 S | 8/2025 | Macari et al. | |
| 12,410,408 B2 | 9/2025 | Macari et al. | |
| 12,485,064 B2 | 12/2025 | Bulka et al. | |
| 2001/0025191 A1 | 9/2001 | Montgomery | |
| 2002/0042131 A1 | 4/2002 | Brockbank et al. | |
| 2002/0051779 A1 | 5/2002 | Gage et al. | |
| 2002/0064768 A1 | 5/2002 | Polyak et al. | |
| 2002/0068360 A1 | 6/2002 | Brockbank et al. | |
| 2002/0115634 A1 | 8/2002 | Polyak et al. | |
| 2002/0138013 A1 | 9/2002 | Guerrero et al. | |
| 2002/0177117 A1 | 11/2002 | Wolf | |
| 2003/0022148 A1 | 1/2003 | Seki | |
| 2003/0053998 A1 | 3/2003 | Daemen et al. | |
| 2003/0054540 A1 | 3/2003 | Alford et al. | |
| 2003/0080126 A1 | 5/2003 | Voute et al. | |
| 2003/0118980 A1 | 6/2003 | Taylor | |

| | | | |
|---|---|---|---|
| 2003/0125804 A1 | 7/2003 | Kruse et al. | |
| 2003/0180704 A1 | 9/2003 | Brockbank et al. | |
| 2004/0014199 A1 | 1/2004 | Streeter | |
| 2004/0038192 A1 | 2/2004 | Brasile | |
| 2004/0038193 A1 | 2/2004 | Brasile | |
| 2004/0045314 A1 | 3/2004 | Roth et al. | |
| 2004/0058432 A1 | 3/2004 | Owen et al. | |
| 2004/0067480 A1 | 4/2004 | Brockbank et al. | |
| 2004/0111104 A1 | 6/2004 | Schein et al. | |
| 2004/0170950 A1 | 9/2004 | Prien | |
| 2004/0171138 A1 | 9/2004 | Hassanein et al. | |
| 2004/0221719 A1 | 11/2004 | Wright et al. | |
| 2004/0224298 A1 | 11/2004 | Brassil et al. | |
| 2004/0224299 A1 | 11/2004 | Garland et al. | |
| 2004/0241634 A1 | 12/2004 | Millis et al. | |
| 2004/0248281 A1 | 12/2004 | Wright et al. | |
| 2005/0100876 A1 | 5/2005 | Khirabadi et al. | |
| 2005/0147958 A1 | 7/2005 | Hassanein et al. | |
| 2005/0153271 A1* | 7/2005 | Wenrich | A01N 1/10 |
| | | | 435/1.1 |
| 2005/0221269 A1 | 10/2005 | Taylor et al. | |
| 2005/0233299 A1 | 10/2005 | Sawa et al. | |
| 2005/0255442 A1 | 11/2005 | Brassil et al. | |
| 2005/0277106 A1 | 12/2005 | Daemen et al. | |
| 2006/0019388 A1 | 1/2006 | Hutmacher et al. | |
| 2006/0063142 A1 | 3/2006 | Owen et al. | |
| 2006/0121439 A1 | 6/2006 | Baker | |
| 2006/0121512 A1 | 6/2006 | Parenteau | |
| 2006/0121605 A1 | 6/2006 | Parenteau | |
| 2006/0141077 A1 | 6/2006 | Pettersson | |
| 2006/0148062 A1 | 7/2006 | Hassanein et al. | |
| 2006/0154357 A1 | 7/2006 | Hassanein et al. | |
| 2006/0154358 A1 | 7/2006 | Hassanein et al. | |
| 2006/0154359 A1 | 7/2006 | Hassanein et al. | |
| 2006/0160204 A1 | 7/2006 | Hassanein et al. | |
| 2006/0168985 A1 | 8/2006 | Gano | |
| 2006/0233986 A1 | 10/2006 | Gutsche et al. | |
| 2006/0292544 A1 | 12/2006 | Hassanein et al. | |
| 2007/0009881 A1 | 1/2007 | Arzt et al. | |
| 2007/0015131 A1 | 1/2007 | Arzt et al. | |
| 2007/0028642 A1* | 2/2007 | Glade | A61B 90/98 |
| | | | 62/457.2 |
| 2007/0166292 A1 | 7/2007 | Brasile | |
| 2007/0184545 A1 | 8/2007 | Plaats et al. | |
| 2007/0190636 A1 | 8/2007 | Hassanein et al. | |
| 2007/0193297 A1* | 8/2007 | Wilson | F25D 29/00 |
| | | | 62/457.2 |
| 2007/0243518 A1 | 10/2007 | Sema et al. | |
| 2007/0264485 A1 | 11/2007 | Stepanian et al. | |
| 2007/0275364 A1 | 11/2007 | Hassanein et al. | |
| 2008/0017194 A1 | 1/2008 | Hassanein et al. | |
| 2008/0070229 A1 | 3/2008 | Streeter | |
| 2008/0070302 A1 | 3/2008 | Brockbank et al. | |
| 2008/0096184 A1 | 4/2008 | Brasile | |
| 2008/0145919 A1 | 6/2008 | Franklin et al. | |
| 2008/0187901 A1 | 8/2008 | Doorschodt et al. | |
| 2008/0234768 A1 | 9/2008 | Hassanein et al. | |
| 2008/0286747 A1 | 11/2008 | Curtis et al. | |
| 2008/0288399 A1 | 11/2008 | Curtis et al. | |
| 2008/0311552 A1 | 12/2008 | Min | |
| 2009/0078699 A1 | 3/2009 | Mustafa et al. | |
| 2009/0197240 A1 | 8/2009 | Fishman et al. | |
| 2009/0197241 A1 | 8/2009 | Fishman et al. | |
| 2009/0197292 A1 | 8/2009 | Fishman et al. | |
| 2009/0197324 A1 | 8/2009 | Fishman et al. | |
| 2009/0197325 A1 | 8/2009 | Fishman et al. | |
| 2009/0199904 A1 | 8/2009 | Babbitt et al. | |
| 2009/0226878 A1 | 9/2009 | Taylor et al. | |
| 2009/0240277 A1 | 9/2009 | Connors et al. | |
| 2009/0291486 A1 | 11/2009 | Wenrich | |
| 2010/0015592 A1 | 1/2010 | Doorschodt | |
| 2010/0028850 A1 | 2/2010 | Brassil | |
| 2010/0056966 A1 | 3/2010 | Toth | |
| 2010/0086907 A1 | 4/2010 | Bunegin et al. | |
| 2010/0112542 A1 | 5/2010 | Wright et al. | |
| 2010/0129784 A1 | 5/2010 | Eichentopf et al. | |
| 2010/0151559 A1 | 6/2010 | Garland et al. | |
| 2010/0171802 A1 | 7/2010 | Lee et al. | |
| 2010/0175393 A1 | 7/2010 | Burke et al. | |

(56) References Cited

U.S. PATENT DOCUMENTS

| | | |
|---|---|---|
| 2010/0209902 A1 | 8/2010 | Zal et al. |
| 2010/0216110 A1 | 8/2010 | Brockbank |
| 2010/0221696 A1 | 9/2010 | Owen et al. |
| 2010/0233670 A1 | 9/2010 | Gavish |
| 2010/0234928 A1 | 9/2010 | Rakhorst et al. |
| 2011/0033916 A1 | 2/2011 | Hutzenlaub et al. |
| 2011/0039253 A1 | 2/2011 | Owen et al. |
| 2011/0053256 A1 | 3/2011 | Owen et al. |
| 2011/0059429 A1 | 3/2011 | Owen et al. |
| 2011/0065169 A1 | 3/2011 | Steen et al. |
| 2011/0129810 A1 | 6/2011 | Owen et al. |
| 2011/0129908 A1 | 6/2011 | Owen et al. |
| 2011/0136096 A1 | 6/2011 | Hassanein et al. |
| 2011/0173023 A1 | 7/2011 | LeClair et al. |
| 2011/0177487 A1 | 7/2011 | Simsir et al. |
| 2011/0183310 A1 | 7/2011 | Kravitz et al. |
| 2011/0212431 A1 | 9/2011 | Bunegin et al. |
| 2011/0217689 A1 | 9/2011 | Bunegin et al. |
| 2012/0042976 A1 | 2/2012 | Toledo |
| 2012/0116152 A1 | 5/2012 | Faulkner et al. |
| 2012/0148542 A1 | 6/2012 | Kravitz |
| 2012/0264104 A1 | 10/2012 | Ferrera |
| 2012/0266564 A1 | 10/2012 | Haarmann et al. |
| 2012/0301952 A1 | 11/2012 | Anderson et al. |
| 2012/0309078 A1 | 12/2012 | Anderson et al. |
| 2013/0177897 A1 | 7/2013 | Kravitz et al. |
| 2014/0041403 A1 | 2/2014 | Anderson et al. |
| 2014/0087357 A1 | 3/2014 | Kohl et al. |
| 2014/0140815 A1 | 5/2014 | Shener-Irmakoglu et al. |
| 2014/0157797 A1 | 6/2014 | Kovalick et al. |
| 2014/0314881 A1 | 10/2014 | Reynolds et al. |
| 2014/0349273 A1 | 11/2014 | Anderson et al. |
| 2014/0356850 A1 | 12/2014 | Anderson et al. |
| 2014/0356933 A1 | 12/2014 | Anderson et al. |
| 2014/0377880 A1 | 12/2014 | Emburgh et al. |
| 2015/0204598 A1* | 7/2015 | Affleck ................. A01N 1/145 |
| 2015/0209017 A1 | 7/2015 | Fleming et al. |
| 2015/0230453 A1 | 8/2015 | Fontes et al. |
| 2015/0373967 A1 | 12/2015 | Anderson et al. |
| 2016/0074234 A1 | 3/2016 | Abichandani et al. |
| 2016/0095310 A1 | 4/2016 | Anderson et al. |
| 2016/0183517 A1 | 6/2016 | Potenziano |
| 2016/0271015 A1 | 9/2016 | Wengreen et al. |
| 2016/0347532 A1 | 12/2016 | McCormick |
| 2016/0355318 A1* | 12/2016 | Epenetos ........... B65D 81/3806 |
| 2016/0362240 A1 | 12/2016 | Ferracamo, Jr. |
| 2016/0374332 A1 | 12/2016 | Hassanein et al. |
| 2017/0113181 A1 | 4/2017 | Sinstedten et al. |
| 2017/0318803 A1 | 11/2017 | Gil et al. |
| 2018/0000068 A1 | 1/2018 | Peralta |
| 2018/0132478 A1 | 5/2018 | Anderson et al. |
| 2018/0352807 A1 | 12/2018 | Judson et al. |
| 2019/0038388 A1 | 2/2019 | Schmitt et al. |
| 2019/0175394 A1 | 6/2019 | Kim |
| 2019/0320649 A1 | 10/2019 | Bunegin |
| 2019/0374693 A1 | 12/2019 | Kheradvar et al. |
| 2020/0187490 A1 | 6/2020 | Kravitz et al. |
| 2020/0253195 A1 | 8/2020 | Bagnato et al. |
| 2020/0278339 A1 | 9/2020 | Wang et al. |
| 2020/0375178 A1 | 12/2020 | Becker et al. |
| 2021/0235691 A1 | 8/2021 | Collette et al. |
| 2021/0400952 A1 | 12/2021 | Judson et al. |
| 2021/0400953 A1 | 12/2021 | Anderson et al. |
| 2022/0007368 A1 | 1/2022 | Tang et al. |
| 2022/0007638 A1 | 1/2022 | Judson et al. |
| 2022/0256838 A1 | 8/2022 | Anderson et al. |
| 2022/0322658 A1 | 10/2022 | Keshavjee et al. |
| 2023/0059208 A1 | 2/2023 | Shelton et al. |
| 2023/0073834 A1 | 3/2023 | Luke |
| 2023/0089628 A1 | 3/2023 | Freed |
| 2023/0092486 A1 | 3/2023 | Pettinato et al. |
| 2023/0284613 A1 | 9/2023 | Filgate et al. |
| 2023/0284614 A1 | 9/2023 | Anderson et al. |
| 2023/0337659 A1 | 10/2023 | Judson et al. |
| 2024/0389576 A1 | 11/2024 | Anderson et al. |
| 2024/0389577 A1 | 11/2024 | Anderson et al. |
| 2024/0415110 A1 | 12/2024 | Anderson et al. |
| 2025/0064052 A1 | 2/2025 | Bulka et al. |
| 2025/0064674 A1 | 2/2025 | Bulka et al. |
| 2025/0072415 A1 | 3/2025 | Anderson et al. |
| 2025/0072416 A1 | 3/2025 | Anderson et al. |
| 2025/0198984 A1 | 6/2025 | Patel |
| 2025/0204518 A1 | 6/2025 | Patel |
| 2025/0204519 A1 | 6/2025 | Bornhoft et al. |
| 2025/0248390 A1 | 8/2025 | Macari et al. |
| 2025/0250546 A1 | 8/2025 | Macari et al. |
| 2025/0302032 A1 | 10/2025 | Anderson et al. |
| 2025/0311717 A1 | 10/2025 | Churchill et al. |
| 2025/0311718 A1 | 10/2025 | Churchill et al. |
| 2025/0311719 A1 | 10/2025 | Churchill et al. |
| 2025/0318519 A1 | 10/2025 | Judson et al. |
| 2025/0339335 A1 | 11/2025 | Bulka et al. |
| 2025/0344692 A1 | 11/2025 | Collette et al. |
| 2025/0351816 A1 | 11/2025 | Anderson et al. |
| 2025/0351817 A1 | 11/2025 | Judson et al. |
| 2025/0374918 A1 | 12/2025 | Tajima et al. |
| 2025/0388872 A1 | 12/2025 | Macari et al. |

FOREIGN PATENT DOCUMENTS

| | | |
|---|---|---|
| CA | 2775327 | 3/2011 |
| CA | 3149024 | 3/2021 |
| CH | 551741 | 7/1974 |
| CN | 100402103 C | 7/2008 |
| CN | 101322861 | 12/2008 |
| CN | 104619169 | 5/2015 |
| CN | 105660603 | 6/2016 |
| CN | 205337358 | 6/2016 |
| CN | 107183005 | 9/2017 |
| CN | 112806351 | 5/2021 |
| CN | 308966732 | 11/2024 |
| DE | 19922310 | 11/2000 |
| DE | 10-2005-048625 | 4/2007 |
| EP | 0376763 | 7/1990 |
| EP | 1017274 | 11/2003 |
| EP | 2278874 | 2/2011 |
| EP | 2480069 | 8/2012 |
| EP | 4344544 | 4/2024 |
| FR | 2830077 | 4/2004 |
| JP | H08-169801 | 7/1996 |
| JP | 2000-279519 | 10/2000 |
| JP | 3775098 | 5/2006 |
| JP | 2008-120713 | 5/2008 |
| KR | 10-1499735 | 3/2015 |
| WO | WO 1991/03934 | 4/1991 |
| WO | WO 1994/09274 | 4/1994 |
| WO | WO 1995/12973 | 5/1995 |
| WO | WO 1996/30111 | 10/1996 |
| WO | WO 1997/43899 | 11/1997 |
| WO | WO 1999/15011 | 4/1999 |
| WO | WO 2000/18225 | 4/2000 |
| WO | WO 2000/18226 | 4/2000 |
| WO | WO 2000/60935 | 10/2000 |
| WO | WO 2001/03505 | 1/2001 |
| WO | WO 2001/37719 | 5/2001 |
| WO | WO 2001/54495 | 8/2001 |
| WO | WO 2001/78504 | 10/2001 |
| WO | WO 2001/78505 | 10/2001 |
| WO | WO 2001/95717 | 12/2001 |
| WO | WO 2002/17714 | 3/2002 |
| WO | WO 2002/26034 | 4/2002 |
| WO | WO 2002/32225 | 4/2002 |
| WO | WO 2002/089571 | 11/2002 |
| WO | WO 2004/017838 | 3/2004 |
| WO | WO 2004/026031 | 4/2004 |
| WO | WO 2004/052101 | 6/2004 |
| WO | WO 2004/089085 | 10/2004 |
| WO | WO 2004/089090 | 10/2004 |
| WO | WO 2004/105484 | 12/2004 |
| WO | WO 2004/110146 | 12/2004 |
| WO | WO 2005/022994 | 3/2005 |
| WO | WO 2005/074681 | 8/2005 |
| WO | WO 2005/099588 | 10/2005 |
| WO | WO 2006/033674 | 3/2006 |

(56) References Cited

FOREIGN PATENT DOCUMENTS

| | | |
|---|---|---|
| WO | WO 2006/042138 | 4/2006 |
| WO | WO 2006/052133 | 5/2006 |
| WO | WO 2006/060709 | 6/2006 |
| WO | WO 2006/101393 | 9/2006 |
| WO | WO 2007/025215 | 3/2007 |
| WO | WO 2007/111495 | 10/2007 |
| WO | WO 2007/124044 | 11/2007 |
| WO | WO 2008/108996 | 9/2008 |
| WO | WO 2008/144021 | 11/2008 |
| WO | WO 2008/150587 | 12/2008 |
| WO | WO 2009/020412 | 2/2009 |
| WO | WO 2009/041806 | 4/2009 |
| WO | WO 2009/099939 | 8/2009 |
| WO | WO 2009/132018 | 10/2009 |
| WO | WO 2010/084424 | 7/2010 |
| WO | WO 2010/096821 | 8/2010 |
| WO | WO 2011/038251 | 3/2011 |
| WO | WO 2012/125782 | 9/2012 |
| WO | WO 2013/068752 | 5/2013 |
| WO | WO 2014/026119 | 2/2014 |
| WO | WO 2014/026128 | 2/2014 |
| WO | WO 2015/021513 | 2/2015 |
| WO | WO 2015/126853 | 8/2015 |
| WO | WO 2017/205967 | 12/2017 |
| WO | WO 2017/205987 | 12/2017 |
| WO | WO 2018/015548 | 1/2018 |
| WO | WO 2018/112072 | 6/2018 |
| WO | WO 2018/184100 | 10/2018 |
| WO | WO 2018/226993 | 12/2018 |
| WO | WO 2020/061202 | 3/2020 |
| WO | WO 2020/252148 | 12/2020 |
| WO | WO 2021/041181 | 3/2021 |
| WO | WO 2021/155147 | 8/2021 |
| WO | WO 2023/154793 | 8/2023 |
| WO | WO 2025/049335 | 3/2025 |
| WO | WO 2025/166189 | 7/2025 |
| WO | WO 2025/217060 | 10/2025 |
| WO | WO 2025/255395 | 12/2025 |

OTHER PUBLICATIONS

Ma et al., "Application and research progress of phase change materials in biomedical field", Biomater. Sci. Vol. 9:5762-5780 (2021).

Michel et al., "Innovative cold storage of donor organs using the Paragonix Sherpa Pak☐devices", Heart Lung and Vessels, vol. 7(3):246-255 (2015) XP093292267, retrieved from the internet on Jul. 2, 2025 at: https://pmc.ncbi.nlm.nih.gov/articles/PMC4593023/pdf/hlv-07-246.pdf.

Yufer et al., "A tissue impendance measurement chip for myocardial ischemia detection", IEEE Transactions on Circuits and Systems-I:Regular Papers, vol. 52(12):2620-2628 (2005).

Brown, "Chemical measurements of inulin concentrations in peritoneal dialysis solution", Clin. Chim. vol. 76:103-112 (1977).

Bunegin et al., Interstitial pO2 and high energy phosphates in the canine heart during hypothermic preservation in a new, portable, pulsatile perfusion device, from the Department of Anesthesiology University of Texas Health Science Center at San Antonio, Texas; and Center for Cardiovascular Surgery of the Republic of Lithuania, Vilnius, Lithuania, vol. 3(3):1-6 (1998).

Bunegin et al., The Application of Fluidics Technology for perfusion of adult, human sized, canine hearts, from the Department of Anesthesiology, Health Science Center at San Antonio, University of Texas, vol. 8(1/2):73-78 (2003).

Bunegin et al., "The Application of Fluidics Technology for Organ Preservation", Biomedical Instrumentation & Technology, Mar./Apr. 2004, pp. 155-164.

Calhoon et al., "Twelve-Hour Canine Heart Preservation With a Simple, Portable Hypothermic Organ Perfusion Device", r\nn Thorac Surg 1996:62:91-93.

Ceulemans et al., "Combined liver and lung transplantation", American Journal of Transplantation, vol. 14(10):2412-2416 (2014).

Cypel et al., "Extracorporeal lung perfusion", Current Opinion in Organ Transplantation, vol. 21(3):329-335 (2016).

De Perrot, "Lung preservation, Seminars in Thoracic and Cardiovascular Surgery", Saunders, Philadelphia, PA vol. 16(4):300-308 (2004).

Galasso, "Inactivating hepatits C virus in donor lungs using light therapies during normothermic ex vivo lung perfusion", Nature Communications, vol. 10(481):1-12 (2019).

Irish Medicines Board "Viaspan" Summary of Product Characteristics available online at<https://www.hpra.ie/img/_./JcenseSPC_PA0002-075-001_21112012111041.pdf>, Nov. 21, 2012 (6 Pages).

Organ Recovery Systems, Inc., LifePort Brochure, www.organ-recovery.com retrieved Aug. 29, 2012 (12 pages).

Raredon et al., "Biomimetic culture reactor for whole lung engineering", BioResearch, vol. 5.1:72-83 (2016).

Steinbrook, The New England Journal of Medicine, "Organ Donation after Cardiac Death", Jul. 9, 2007 (5 pages).

T'hart, "New solutions in organ preservation", Transplantation Reviews, vol. 16:131-141 (2006).

Tolstykh et al., "Novel portable hypothermic pulsatile perfusion preservation technology: Improved viability and function of rodent and canine kidneys", Ann Transplant, 2010; 15(3):1-9.

Tolstykh et al., "Perfusion preservation of rodent kidneys in a portable preservation device based on fuidics technology", Transplantation, vol. 73(9):1508-1526 (2002).

Wandall et al., "Galactosylation does not prevent the rapid clearance of long-term 40C-stored platelets", Blood, vol. 11(6):3249-3256 (2008).

Weegman et al., "Continuous Real-time Viability Assessment of Kidneys Based on Oxygen Consumption", Transplant Proc. 2010; 42(6):2020-2023.

Extended European Search Report issued in European Patent Application No. 13828327.0, date of mailing: Feb. 9, 2016, in 7 pages.

International Preliminary Report on Patenlability issued in International Application No. PCT/US2009/041274, dale of rnailing: Jun. 24, 2009 (5 pages).

International Search Report and Written Opinion issued in International Application No. PCT/US2009/041274, date of mailing: Jun. 24, 2009 (6 pages).

International Search Report and Written Opinion issued in International Application No. PCT/US2010/050230, date of mailing: Feb. 14, 2011, in 12 pages.

International Search Report and Written Opinion issued in International Application No.PCT/US2013/054353, date of mailing: Dec. 16, 2013, in 8 pages.

International Search Report and Written Opinion issued in International Application No. PCT/US2013/054365, date of mailing: Dec. 9, 2013, in 10 pages.

International Search Report and Written Opinion issued in International Application No. PCT/US2018/036508, date of mailing: Aug. 30, 2018, in 9 pages.

International Search Report and Written Opinion issued in International Application No. PCT/US2020/047324, date of mailing: Oct. 4, 2020, in 15 pages.

International Search Report and Written Opinion issued in International Application No. PCT/US2021/15708, date of mailing: May 7, 2021, in 10 pages.

Extended European Search Report issued in European Patent Application No. 18812781.5, mailed on Feb. 11, 2021, in 8 pages.

Final Office Action issued in U.S. Appl. No. 16/542,050, dated Jan. 13, 2021, in 17 pages.

Ex Parte Quayle Action issued in U.S. Appl. No. 16/542,050 dated Aug. 20, 2021, in 8 pages.

Non-Final Office Action issued in U.S. Appl. No. 16/857,689, dated May 24, 2022, in 14 pages.

Briceno et al., "Back-table surgery pancreas allograft for transplantation: Implications in complications", World Journal of Transplantation, vol. 11(1):1-6 (2021).

Interview with CEO of Paragonix, posted at tactical-medicine.com, posting date Jul. 12, 2022, retrieved Nov. 14, 2023, online, https://

(56) References Cited

OTHER PUBLICATIONS tactical-medicine.com/blogs/news/improving-transplant-survival-with-organ-preservation-tech-interview-with-dr-anderson-ceo-of-paragonix (Year: 2022).

Kidney Transport, retrieved online on Feb. 27, 2025, at: https://fluctus.nl/en/portfolio/kidney-assist/, publication date unknown.

Naoum, "Xometry: Everything you need to know about acrylic and its uses", published May 4, 2022, accessed on Jan. 14, 2025, at https://www.xometry.com/resources/materials/acrylic-pmma/#:~:text=Acrylic%20is%20a%20type%20of,worst%20and%20dysfunctional%20at%20best (2022).

Paragonix SherpaPak, posted at .mmcts.org, posting date Jun. 16, 2021, retrieved Nov. 14, 2023, online, https://mmcts.org/utuorial/1657 (Year: 2021).

Vries et al., "Systms engineering the organ preservation process for transplantation", Current Opinion in Biotechnology, vol. 58:192-201 (2019).

Watanabe et al., "Ex vivo lung perfusion", J Thorac Dis, vol. 13(11):6602-6617 (2021).

SamStores ("Frigidaire MFC09V4GW Chest Freezer 220-240 VOLT 50/60 HZ", retrieved online on Dec. 29, 2025, at: https://www.samstores.com/product-frigidaire-mfc09v4gw-chest-freezer-220-240-volt-5060-hz-7985.html?srsltid=aFmBOoq-kqrX3TYBATp2MXlyQoNj5_mgWVenhVW7UNyzTO8jilcorAAG, in 3 pages (2015).

Unpublished U.S. Appl. No. 19/418,122, filed Dec. 12, 2025, entitled "Apparatus for Tissue Transport and Preservation".

Boteon et al., "Combined hypothermic and normothermic machine perfusion improves functional recovery of extended criteria donor livers", Liver Transplantation, vol. 24(12):1699-1715 (2018).

Van Leeuwen et al., "Sequential hypothermic and normothermic machine perfusion enables safe transplantation of high-risk donor livers", American Journal of Transplantation, vol. 22(6):1658-1670 (2022).

\* cited by examiner

SECTION C-C

SECTION D-D

1207

APPARATUS FOR TISSUE TRANSPORT AND PRESERVATION

RELATED APPLICATIONS

This application is a continuation of U.S. non-provisional application Ser. No. 17/468,142, filed Sep. 7, 2021, which is a continuation-in-part of U.S. non-provisional application Ser. No. 17/378,233, filed Jul. 16, 2021, which is a divisional application of U.S. non-provisional application Ser. No. 16/002,795, filed Jun. 7, 2018, which application claims the benefit of and priority to U.S. provisional patent application Ser. No. 62/516,581, filed Jun. 7, 2017, 62/584,330, filed Nov. 10, 2017, and 62/650,610, filed Mar. 30, 2018, all of the contents of which are incorporated by reference herein in their entirety.

TECHNICAL FIELD

The disclosure relates to systems and methods for the storage and transportation of bodily tissue.

BACKGROUND

The current invention generally relates to devices, systems, and methods for extracorporeal preservation of bodily tissue. Extracorporeal preservation of bodily tissue is essential in transplant procedures so that donor tissue can be transported to a recipient in a remote location. In order to provide the best graft survival rates, donor tissues must be matched to appropriate recipients. Because of the sudden nature of most tissue donation events, appropriate recipients must be rapidly located and must be within a limited geographic area of the donor. Time limitations on the extracorporeal viability of donor tissue can lead to less than ideal tissue matching and, worse, wasted donor tissue. Prolonging the viability of donor tissue can allow for better matching between donor tissue and recipients and, in turn, can increase graft survival rates and increase availability of donor tissue to the growing waitlists of individuals in need of transplants.

The most prevalent current technique for preserving a bodily tissue for transplantation is static cold storage. While hypothermic temperatures decrease the oxygen demand of the bodily tissue, the tissue's viability is still time-limited by insufficient oxygen levels to meet the tissue's decreased metabolic needs. Another known technique for preserving a bodily tissue for transplantation includes the use of hypothermic perfusion devices that can perfuse the tissue with oxygenated perfusate, supplying additional oxygen to the tissue's cells and prolonging tissue viability. The portability of such known devices is limited, however, because such known devices are large and require a significant volume of compressed gas and electrical power. Furthermore, such known devices are very complex, which can lead to increased manufacturing costs and higher failure rates.

An additional limitation of hypothermic storage is the tendency to cause edema, or the accumulation of fluid within the bodily tissue. The level of edema generally increases with the length of hypothermic storage, providing another limitation on the amount of time that a tissue can be stored and remain viable.

Because of the time limitations on tissue viability, even given modem hypothermic storage and perfusion techniques, tissue and organs are often transported via air and, accordingly, subjected to pressure changes associated with changes in altitude.

SUMMARY OF THE INVENTION

Systems and methods of the invention are directed to increasing donor tissue viability during and after storage and transport. In particular, systems and methods relate to storage and transport of lungs. As noted above, tissue transported by air may be subjected to changes in pressure associated with increases and decreases in altitude during flight. While changes in pressure may affect any tissue being transported, they can be particularly harmful to lung tissue. In typical donor lung retrieval and preparation, the donor lung is inflated with air and the trachea or bronchus is stapled to hold the air in the partially inflated lung and to keep preservation fluid out of the airways during storage and transport. Unfortunately, this inflation occurs on the ground and, once subjected to decreases in air pressure from flights at high altitude, the pressure differential between the sealed lung airways and surrounding preservation fluid and air can result in over inflation of the lung and damage to the tissue including rupturing of the alveoli or other air passages. Accordingly systems and methods of the invention may be used to monitor and maintain a relatively constant pressure within donor lungs during transport and storage while maintaining a desired level of inflation. Systems and methods can accomplish those tasks while maintaining separation between the non-sterile airway environment and the sterilized outer tissue surfaces and preservation fluid to help prevent infection of the donor tissue or the transplant recipient. Expandable accumulators of the invention may have variable volume and may include a gauge to indicate the volume of the accumulator. In certain embodiments, the accumulator may be filled to a volume based on the atmospheric pressure at the recovery site in order to compensate for various ambient pressures based on altitude or weather conditions in different locations. Methods may include adjusting the volume of the accumulator based on the ambient pressure at the recovery site before organ transport.

In certain embodiments, an expandable accumulator is coupled to the airways of the donor lung(s) and sealed in fluid communication therewith. The expandable accumulator may be more compliant than the airways of the donor lung such that the expandable accumulator expands in response to a relative increase in the volume of gas (e.g., through a change in relative pressure) contained in the closed system formed by the lungs airways and accumulator. By expanding, the accumulator can accommodate and absorb the relative increases in gas volume, stabilizing pressure within the system, and preventing over-inflation of and damage to the lung tissue.

Another drawback of current lung transport techniques is that lungs are typically transported horizontally on a flat surface or on a bed of crushed ice. Both techniques are far different from the geometry and orientation of the lung's anatomical home. By resting the lung horizontally, gravity can crush or damage the bottom-most airways. A rough bed of crushed ice only complicates the issue. Accordingly, systems and methods of the invention may include replicating the geometry of the chest cavity and/or the orientation of the lung therein during transport and storage of donor lungs. In certain embodiments, a lung or pair of lungs may be placed horizontally on a smooth surface with a raised central saddle portion to replicate the spine. Alternatively, a lung or pair of lungs may be suspended in an upright position similar to the orientation of the lung in a standing human body. In such instances, the lung or lungs may be suspended by the trachea or bronchus which may be secured to a support tube in fluid communication with, for example, an expandable accumulator as described above.

Systems and methods of the invention have application in both static cold storage devices and hypothermic machine perfusion devices. In certain embodiments, hypothermic machine perfusion devices are configured to oxygenate and perfuse a bodily tissue for extracorporeal preservation of the bodily tissue. In lung applications, the perfusate may be pumped through the lung's vasculature and kept separate from the closed airway-accumulator air system described above. The perfusion apparatuses can include a pneumatic system, a pumping chamber, and an organ chamber. The pneumatic system may be configured for the controlled delivery of fluid to and from the pumping chamber based on a predetermined control scheme. The predetermined control scheme can be, for example, a time-based control scheme or a pressure-based control scheme. The pumping chamber is configured to diffuse a gas into a perfusate and to generate a pulse wave for moving the perfusate through a bodily tissue. The organ chamber is configured to receive the bodily tissue and the perfusate. The organ chamber is configured to substantially automatically purge excess fluid from the organ chamber to the pumping chamber. The pumping chamber may be configured to substantially automatically purge excess fluid from the pumping chamber to an area external to the apparatus.

DETAILED DESCRIPTION

Figure 1:
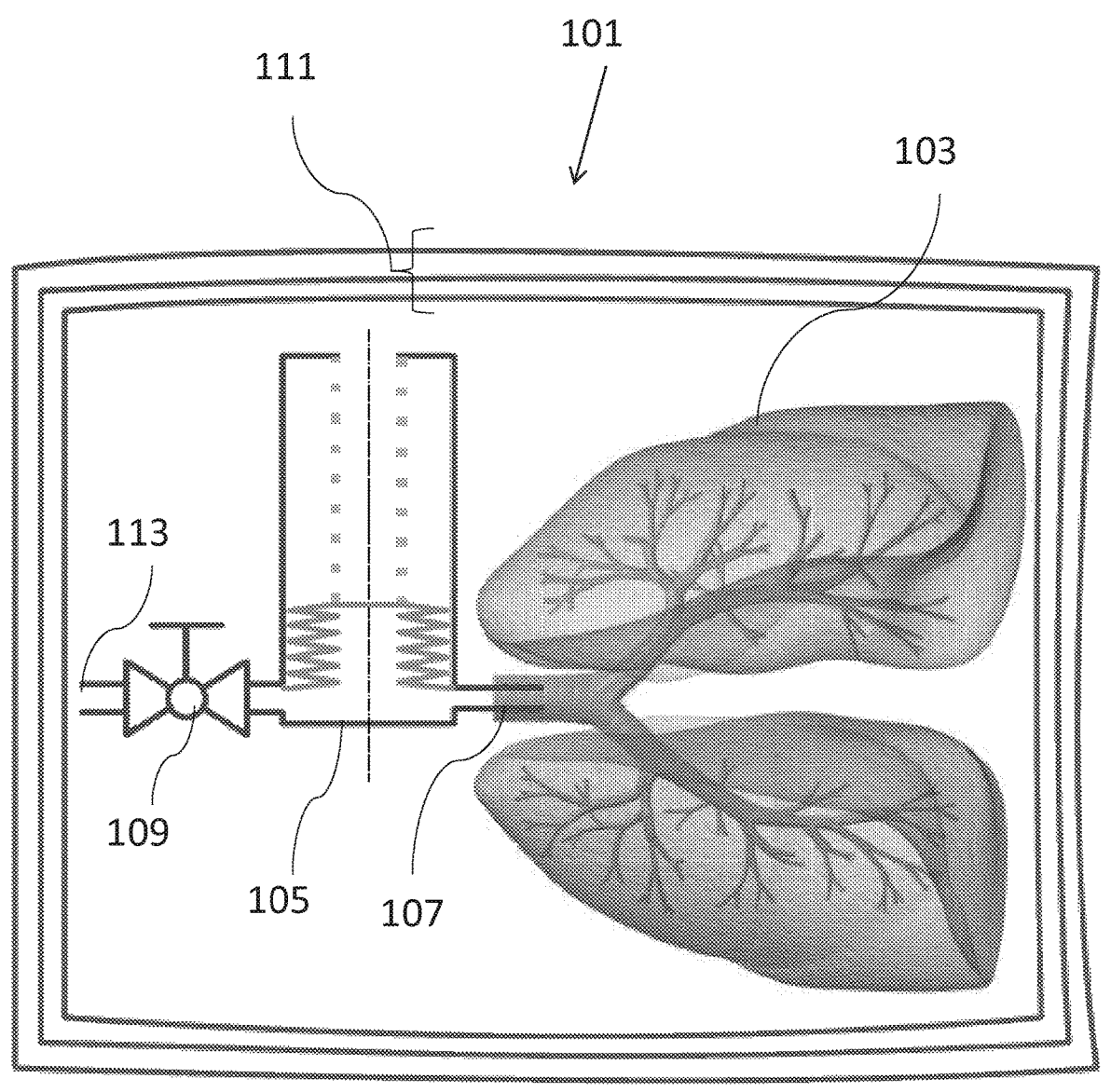
FIG. 1 shows a system including a contained bellows-type expandable accumulator.

Devices, systems and methods are described herein that are configured for extracorporeal preservation and transportation of bodily tissue. Specifically, devices for monitoring and stabilizing pressure within inflated lungs are described. Systems and methods can compensate for pressure changes resulting from, for example, increases and decreases in altitude during air transport of the organ. By bleeding off and returning excess gases, volumetric expansion of the lung (i.e., over-inflation) may be prevented, avoiding damaging the organ which can result in decreased organ viability and decreased survival rates for transplant recipients. Additional aspects include contoured storage and transport chambers that can replicate the in-vivo anatomical orientation and geometry for a given organ. For example, a pair of donor lungs may be placed against a smooth, raised, central saddle designed to replicate the spine that the lungs would be resting against in vivo. Organs, such as lungs or hearts, may be suspended in an upright position to replicate the organ's orientation in a standing human and to prevent tissue damage caused by pressure from the organ's own weight resting on itself FIG. 1 illustrates a tissue preservation and transportation system 101 according to certain embodiments. An organ adapter 107 is adapted to be coupled to the airways (e.g., by the trachea or bronchus) of a lung 103. The organ adapter 107 may comprise a lumen that, when the organ adapter 107 is coupled to the lung 103, is in fluid communication with the airways of the lung 103.

The organ adapter 107 is coupled to an expandable accumulator 105 and the lumen of the organ adapter 107 is in fluid communication with a sealed interior volume of the expandable accumulator 105. The expandable accumulator 105 may be coupled by a valve 109, to an inlet 113. The inlet 113 has a lumen that, when the valve 109 is open, is in fluid communication with the interior volume of the expandable accumulator 105, the lumen of the organ adapter 107, and the airways of the lung 103. When the valve 109 is closed, the interior volume of the expandable accumulator 105, the lumen of the organ adaptor 107, and the airways of the lung 103 form an air-tight, closed environment that is sealed from the outside environment including, for example, any preservation fluid present within the organ container 111. The organ container 111 may include one or more boxes or bags configured to contain both the organ and any preservation fluid (e.g., temperature regulated, oxygenated fluid) in a sterilized environment. In preferred embodiments, the organ is placed into one or more sterile bags or boxes. For example, a lung may be placed in three concentric sterile bags fitted with a through-the-bag-wall cannula leading into the trachea plug. The cannula may include a filter for each bag (e.g., a 0.2-micron sterile filter). Accordingly, both the exterior surface and interior, pressure-dampened lumen of the organ are surrounded by three sterile layers.

In various embodiments, the accumulator may have an interior volume (fully expanded) of about, 0.5, 0.75, 1, 1.25, 0.1.5, 1.75, 2, 2.5, 3, 3.5, 4, 4.5, or more liters. In preferred embodiments, the accumulator has a fully expanded interior volume of about 1 liter.

System 101 is configured to permit gas to move back and forth between the airways of the lung 103 through the lumen of the organ adapter 107, and into the interior volume of the expandable accumulator 105. When the valve 109 is open, the system 101 is configured to permit gas flow from the inlet 113, through the valve 109, into the lumen of the organ adaptor 107, and finally into the airways of the lung 103. The expansion resistance of the expandable accumulator 105 may be adjustable, fixed, or progressive.

The organ adapter 107 may be configured to substantially retain the bodily tissue (e.g., lung) with respect to the expandable accumulator 105. The organ adapter 107 may be configured to permit movement of a gas from the expandable accumulator 105, into the airways of the lung 103, and back. The organ adapter 107 can be configured to be coupled to a bodily tissue such as a lung 103. The organ adapter 107 can be coupled to the bodily tissue in any suitable manner. For example, in some embodiments, the organ adapter 107 can configured to be sutured to the bodily tissue. In another example, the organ adapter 107 is coupleable to the bodily tissue via an intervening structure, such as silastic or other tubing. In some embodiments, at least a portion of the organ adapter 107, or the intervening structure, is configured to be inserted into the bodily tissue such as the lumen of a trachea, bronchus, or other air passage of a lung 103. For example, in some embodiments, the lumen of the organ adapter 107 (or a lumen of the intervening structure) is configured to be fluidically coupled to a lumen of the bodily tissue such as an air passage of the lung 103.

In various embodiments including the use of one or more sterile bags or other containers for the organ, the organ adapter may be contained in or integral to the inner most sterile bag and coupled to a through-the-bag-wall cannula that transverses each of the bags or other containers. The cannula, at the outer most bag or other container, may include an adapter to be removably coupled to the accumulator in the systems described herein.

Accordingly, the bagged organ may be easily and quickly connected to the accumulator and inflated during loading and easily and quickly disconnected upon arrival at the transplantation site.

In some embodiments, the organ adapter (or simply referred as the adapter) can be configured to support the bodily tissue when the bodily tissue is coupled to the adapter. For example, in some embodiments, the adapter can include a retention mechanism (not shown) configured to be disposed about at least a portion of the bodily tissue and to help retain the bodily tissue with respect to the adapter. The retention mechanism can be, for example, a net, a cage, a sling, or the like. In some embodiments, the system can include a basket (not shown) or other support mechanism configured to support the bodily tissue when the bodily tissue is coupled to the adapter or otherwise received in the system. The organ adapter may be rigidly coupled to an interior wall (e.g. a lid) of an organ container such that the organ may be suspended via its connection point to the adapter.

The portion of the adapter that is inserted into a lumen of the organ may include a series of tapered steps such that a distal end of the adapter portion is narrower than a proximal end. In this manner, the adapter is configured to be inserted into a range of lumen sizes.

The lumen may be secured or sealed to the organ adapter via any means including elastic tension in the organ lumen itself or through the use of sutures, elastic band, or other securing mechanisms on the outside of the lumen applying pressure thereupon to form an air-tight seal between the lumen of the organ and the lumen of the adapter.

The expandable accumulator is configured to expand to accept relative increases in gas volume within the closed system in response to pressure differential changes between the closed system and the surrounding environment (e.g., during flight). The interior volume of the expandable accumulator should resist expansion with an opposing force that is less than that of the lung. Accordingly, decreases in internal pressure of the closed system due to decreases in the pressure of the surrounding environment (e.g. during flight) will be borne by the expandable accumulator such that the pressure within the system drops without volumetric expansion of the lung airways (which could cause tissue damage or rupture the airways).

The expandable accumulator is configured to be in constant communication with the internal (closed system) pressure and the external (surrounding environment) pressure, and to establish a nearly-constant differential between the two while having compliance higher than the lung's compliance. The pressure differential is such that the internal pressure is greater than the environment pressure. The pressure differential keeps the lungs inflated. The pressure differential would commonly be referred to as the gauge pressure. When the system is initially prepared, the external pressure may be 1 bar (absolute) and the internal pressure would be 1+x bar, absolute (where the x is a suitable value chosen for best storage performance). The gauge pressure of the closed system is therefore x bar, and the differential pressure across the lung is also x bar. At a later time, in transport, the external pressure may be 0.75 bar for instance due to airplane cabin pressure when in flight. The internal pressure would be 0.75+x bar, so the gauge pressure is again x bar, as is the pressure across the lung. In this manner the expandable accumulator maintains a nearly-constant pressure differential across the lung (from inside to outside).

In order to maintain the nearly-constant pressure differential the expandable accumulator will have a very high compliance, for example much higher than the lung compliance. In certain embodiments, the system may be configured to maintain about a 15 cm $H_2O$ gauge pressure inside the organ. The pressure may be fixed or may be tunable or adjustable using variable weight, spring tension, or other means depending on the accumulator mechanism. Pressure in the system may be set by filling the system to a desired fixed pressure or may be controlled using an adjustable accumulator which may be acted on by a computer based on inputs received from a pressure or other sensor as described below.

An inlet of the system may be used to add or remove a gas from the lumen of the organ (e.g., airways of a lung). For example, where donor lungs are at least partially inflated for storage and transport, a retrieved lung may be secured to an organ adapter as shown in FIGS. 1-6. The inlet may be then connected to a gas source such as a compressed air tank or a source of oxygen or another gas or combinations thereof. In certain embodiments, the gas source may comprise a pump or bulb for manually filling the system with ambient air or other gas. The pump or bulb may be integral to the transport container and travel with the container or may be used to establish pressure and removed after a valve located between the pump or bulb and the organ is closed. The valve connecting the inlet to the closed system of the lung airways, lumen of the adapter, and interior volume of the expandable accumulator may then be opened and oxygen or another gas or mixture of gasses may then be allowed to flow into the closed system. In certain embodiments (e.g., lung transport), gasses such as oxygen may damage the tissue and, as such, the fill gas will be selected accordingly (e.g., ambient air). The closed system may be inflated to a desired pressure which may be monitored with a pressure gauge or sensor located on the gas source or on the closed system. The pressure sensor may be electric and include a wireless sender located on the closed system such that pressure may be wirelessly monitored from outside an organ transport container during transport.

During inflation, as gas is admitted to the system, both the lungs and the expandable accumulator will inflate until reaching the desired gauge pressure (designated "x" above). As additional gas is thereafter admitted, the gas would preferentially fill the expandable accumulator given that component's higher compliance. When the expandable accumulator is entirely filled, the pressure would begin to rise above the "x" target, and the system would not have any remaining capacity. Therefore, when the system is filled the volume of gas may be adjusted such that a movable element of the expandable accumulator rests at a target position (for instance 25% of travel). Once the expandable accumulator is at that target position, the valve can be closed and the closed system is sealed and ready for transport.

Once the lung has been inflated to a desired pressure, the valve may be closed, sealing off the closed system. The lung coupled to the expandable accumulator by the organ adapter along with the closed valve and the inlet may be then be placed in an organ container for storage or transport and may be at least partially submerged in a fluid such as a preservation fluid as known in the art. Examples of preservation fluid and static and perfusion-based tissue containers compatible with systems and methods of the invention are described in U.S. application Ser. No. 14/460,489, incorporated herein by reference. In preferred embodiments, the preservation solution and/or perfusate is maintained at a temperature between 0 degrees Celsius and 12 degrees Celsius while in contact with the stored bodily tissue.

The fill of the accumulator can be adjusted at organ recovery according to the local ambient (e.g. barometric) pressure. A smaller accumulator would thereby be able to work identically whether filled in Denver CO, or Boston MA, whatever the weather conditions. The accumulator may include a scale or other indicator in customary barometric pressure units. An exemplary pressure indicator 1115 is shown in FIGS. 11, 14, 15, and 19. An ambient pressure sensor or meter may also be included for reading ambient pressure at recovery. The system may then be filled until the piston reaches a mark on the scale or indicator on the accumulator that matches the local barometric pressure reading. If not adjusted to local pressure conditions, a larger accumulator may be used.

The expandable accumulator may be of any configuration that permits expansion of its interior volume with less resistance than that of the lung's airways. Examples of expandable accumulators are shown in FIGS. 1-6. Materials for transport and storage containers of the invention may be selected to reduce weight in key components such as the accumulator. For example, accumulators such as the rolling diaphragm types depicted in FIGS. 3 and 4 may comprise a piston that slides within a cylinder to adjust volume to dampen pressure changes in the tissue. The piston or other accumulator components may be constructed of lightweight materials such as aluminum, plastics, or carbon fiber or may be constructed with lightweight techniques including low material thickness with structural bracing for example. Reducing the weight or mass of the moving pieces of the accumulator helps to minimize pressure changes resulting from movement (e.g., tilting) of the container or accumulator therein. Pressure generating force is thereby primarily established by an accumulator spring and relatively unaffected by gravity.

The expandable accumulator 105 depicted in FIG. 1 comprises a bellows-type interior bladder that permits expansion. The bellows may be contained within a shell that may be rigid to preserve an open interior volume into which the bellows can expand. The bellows may rely on inherent shape memory in the material of the bellows itself to provide resistance to expansion or may use, for example, springs opposing the expansion of the bellows via compression or tension. Any known spring type may be used including coiled materials or elastic bands to provide expansion resistance. The spring rate can be selected such that the expansion resistance provided to the interior volume of the accumulator is less than the expansion resistance of the lung's airways. The expansion resisting force may be a single rate or may be progressive or adjustable. The expansion resisting force can be modeled on the expansion resistance profile of lung airways in order to better maintain a constant pressure within the lung. In various embodiments, a constant force spring can be used to maintain internal pressure. Constant force springs are springs for which the force they exert over their range of motion is relatively constant. Constant force springs may be constructed from rolled ribbons of, for example, spring steel. In certain embodiments, the springs used in the systems depicted in FIGS. 3 and 4 may be constant force springs. In some embodiments, a pair of constant force springs may be used in a back-to-back orientation.

Figure 2:
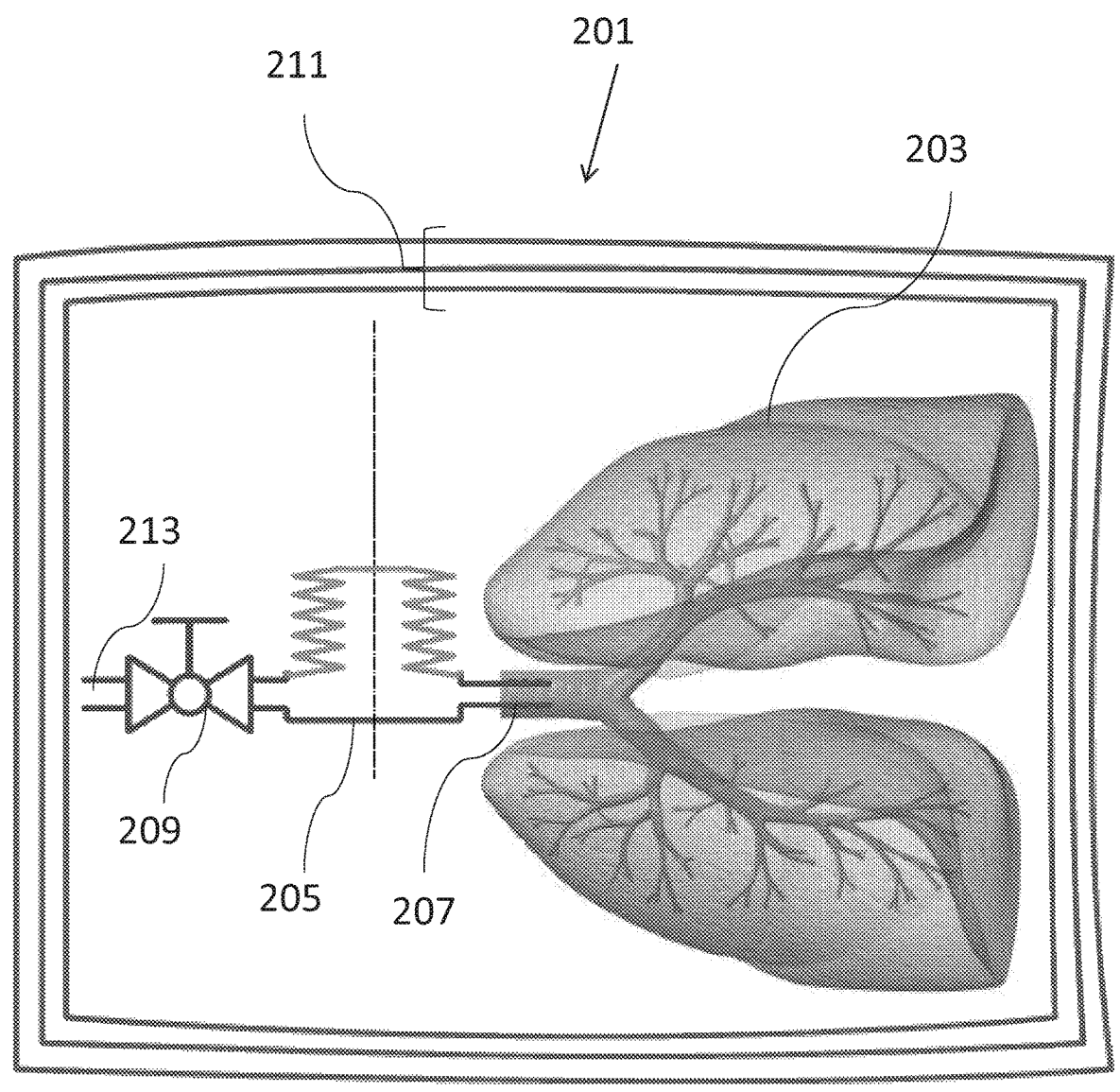
FIG. 2 shows a system including an exposed bellows-type expandable accumulator.

FIG. 2 shows a system 201 including a lung 203, an organ adapter 207, an expandable accumulator 205, a valve 209, and an inlet 213 all placed within an organ container 211.

The components are configured and relate to each other in a similar manner to that shown in FIG. 1 aside from differences in the operation of the expandable accumulator 205. The expandable accumulator 205 comprises a bellows type accumulator 205 that is not contained in a shell such that the outer surface of the expandable accumulator 205 is in direct communication with the interior environment of the organ container 211. The expandable accumulator 205 may provide expansion resistance through its own material properties or through applied force from, for example, a spring.

Figure 3:
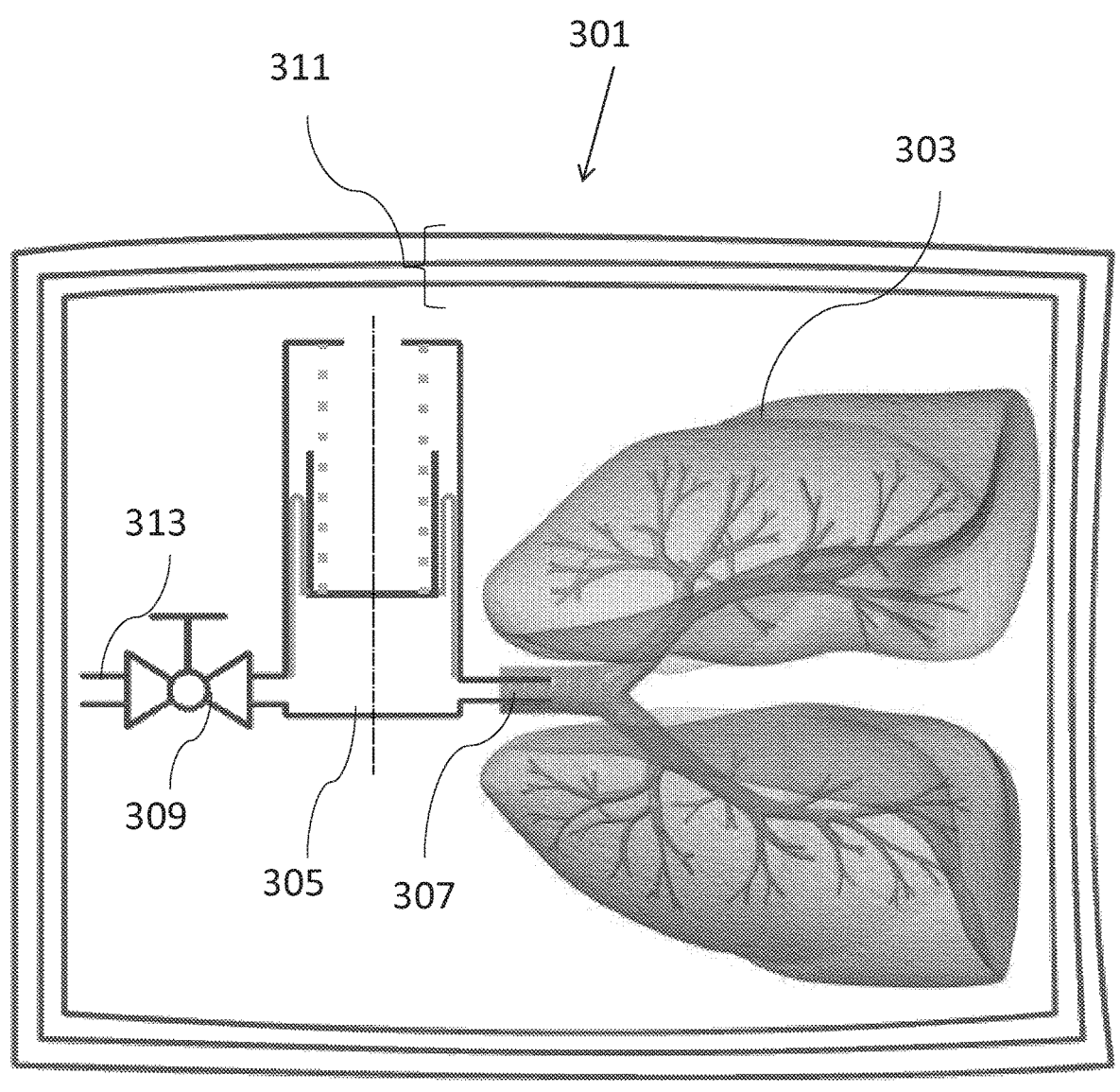
FIG. 3 shows a system including a rolling diaphragm expandable accumulator with a spring in compression providing expansion resistance.

FIG. 3 shows a system 301 including a lung 303, an organ adapter 307, an expandable accumulator 305, a valve 309, and an inlet 313 all placed within an organ container 311. The components are configured and relate to each other in a similar manner to that shown in FIG. 1 aside from differences in the operation of the expandable accumulator 305. The expandable accumulator 305 comprises a rolling diaphragm and a spring in compression to provide expansion resistance.

The rolling diaphragm contributes to a low-friction, low-hysteresis accumulator advantageous to tissue preservation as described herein, especially in lung preservation and transport apparatuses. The diaphragm may be constructed of any suitable material including latex, rubber, or silicon.

Figure 4:
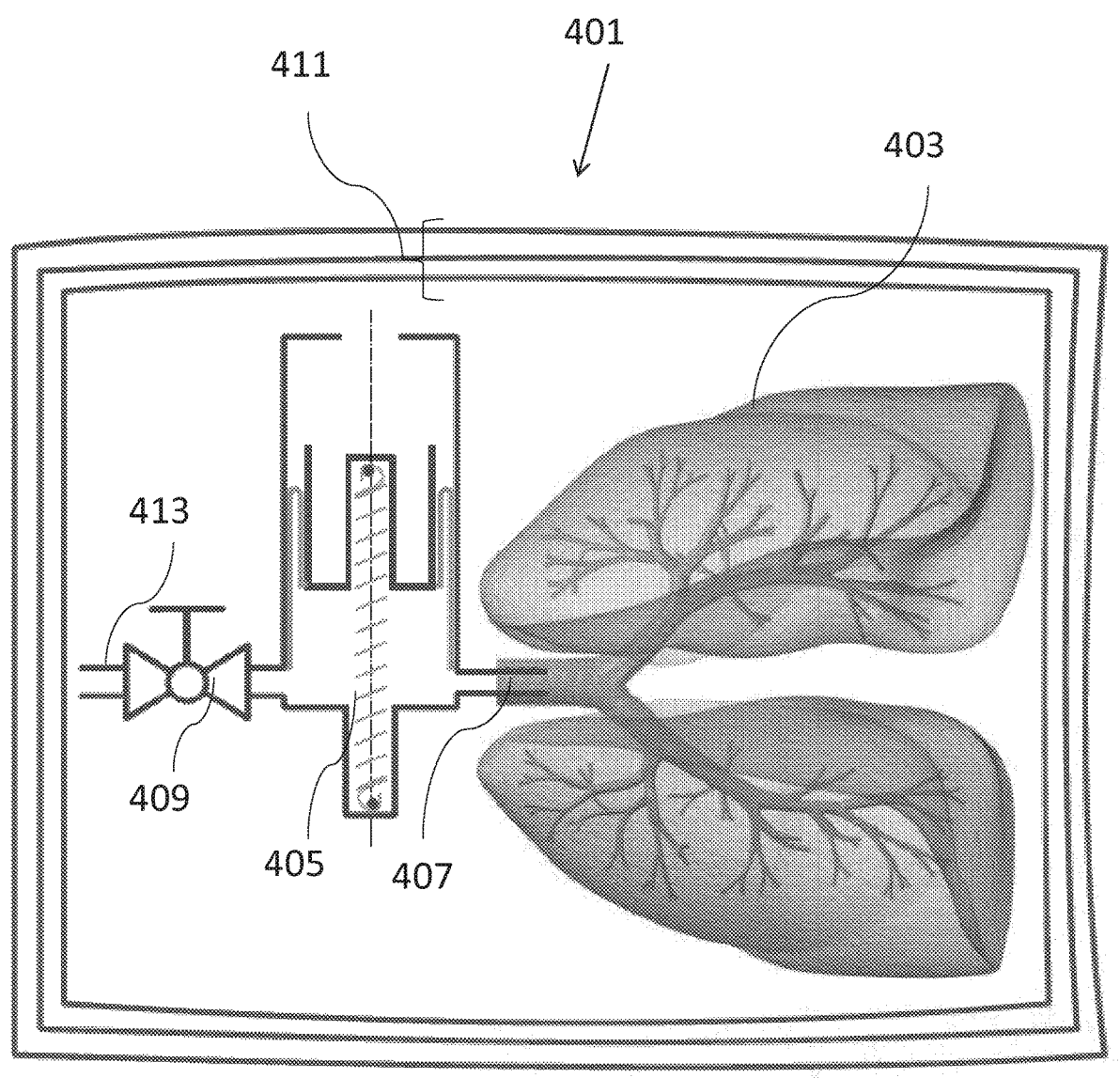
FIG. 4 shows a system including a rolling diaphragm expandable accumulator with a spring in tension providing expansion resistance.

FIG. 4 shows a system 401 including a lung 403, an organ adapter 407, an expandable accumulator 405, a valve 409, and an inlet 413 all placed within an organ container 411. The components are configured and relate to each other in a similar manner to that shown in FIG. 3 aside from differences in the operation of the expandable accumulator 405. The expandable accumulator 405 comprises a rolling diaphragm and a spring in tension to provide expansion resistance.

A diaphragm-type accumulator system as exemplified in FIGS. 3 and 4 may use a constant force spring to maintain a constant internal pressure in the lung or other organ. The diaphragm may be coupled to one or more springs in tension, compression, or some combination thereof (e.g., two opposing springs coupled to the diaphragm and providing expansion resistance through both compression and tension).

Figure 5:
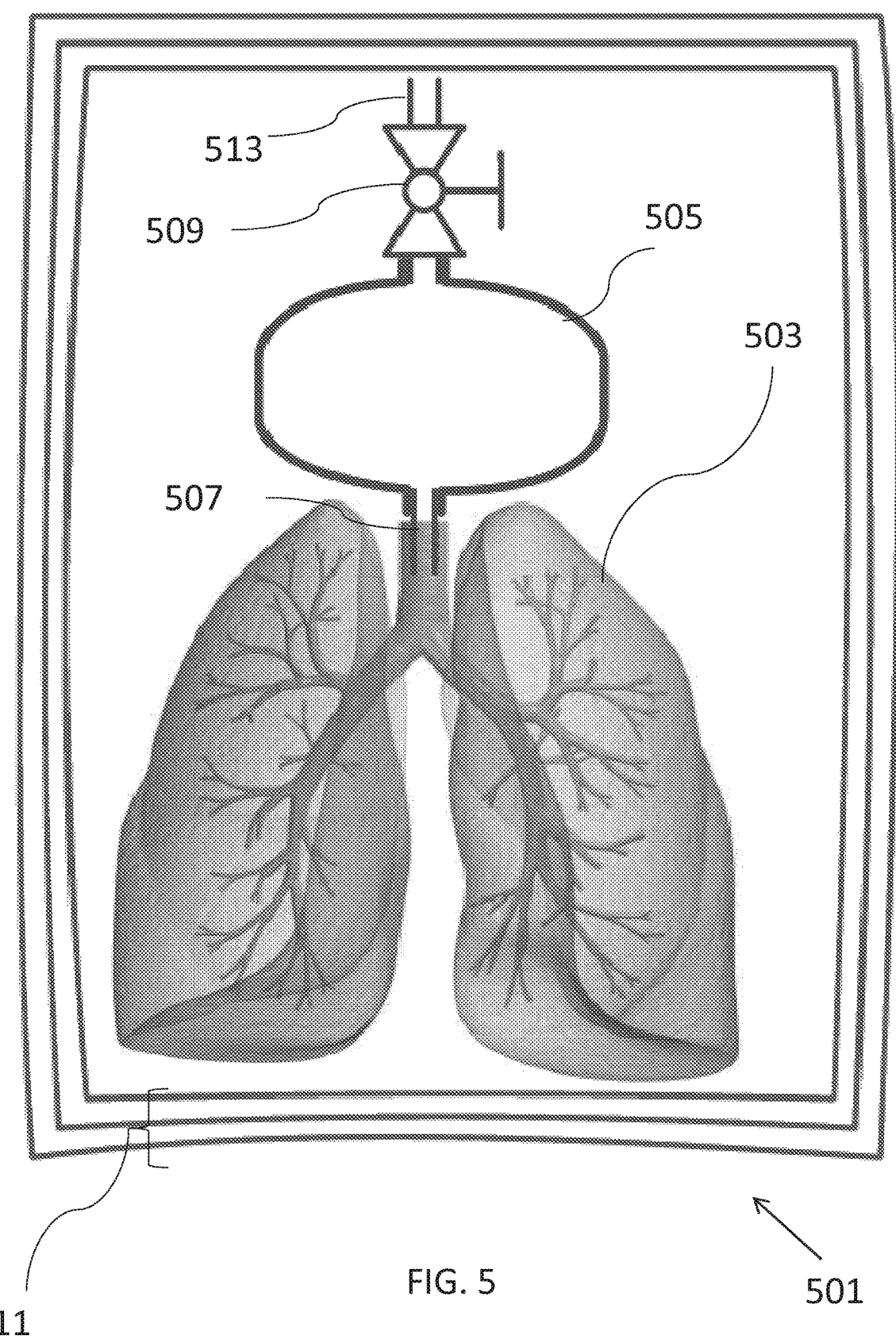
FIG. 5 shows a system including a balloon-type expandable accumulator.

FIG. 5 shows a system 501 including a lung 503, an organ adapter 507, an expandable accumulator 505, a valve 509, and an inlet 513 all placed within an organ container 511. The components are configured and relate to each other in a similar manner to that shown in FIG. 1 aside from differences in the operation of the expandable accumulator 205. The expandable accumulator 505 comprises a balloon-type bladder wherein expansion resistance is provided by the elasticity of the material comprising the walls of the expandable accumulator 505. As shown in FIG. 5, the lungs 503 are suspended in a vertical orientation from the organ adapter 507 providing the benefits described above.

Figure 6:
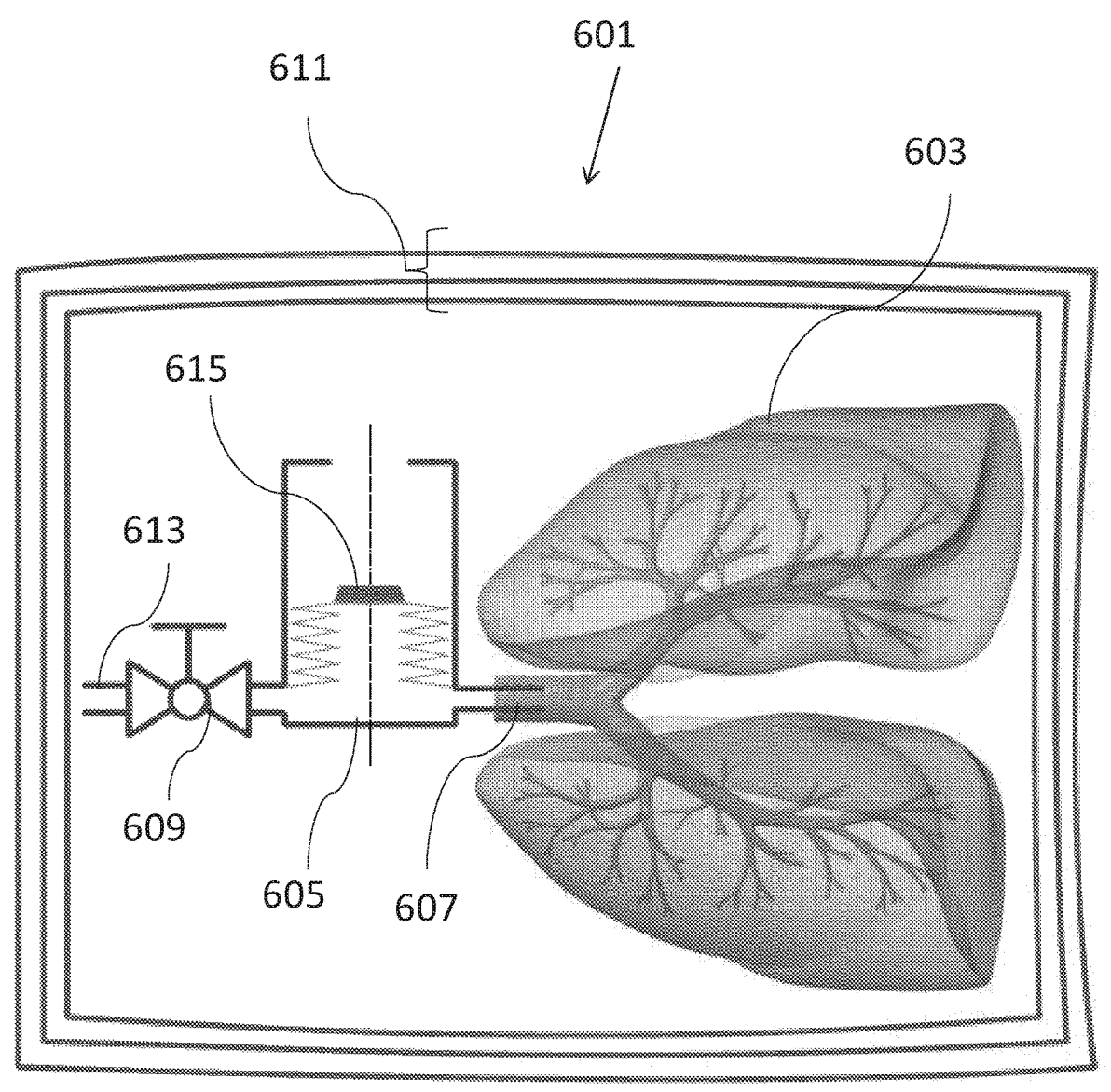
FIG. 6 shows a system including a contained bellows-type expandable accumulator with a weight providing expansion resistance.

FIG. 6 shows a system 601 including a lung 603, an organ adapter 607, an expandable accumulator 605, a valve 609, and an inlet 613 all placed within an organ container 611. The components are configured and relate to each other in a similar manner to that shown in FIG. 1 aside from differences in the operation of the expandable accumulator 605. The expandable accumulator 105 depicted in FIG. 1 comprises a bellows-type interior bladder that permits expansion. The bellows may be contained within a shell that may be rigid to preserve an open interior volume into which the bellows can expand. The bellows may rely on inherent shape memory in the material of the bellows itself to provide resistance to expansion or may use, for example, gravity to provide the expansion resistance through a weight 615 placed on top of the bellows.

Figure 7:
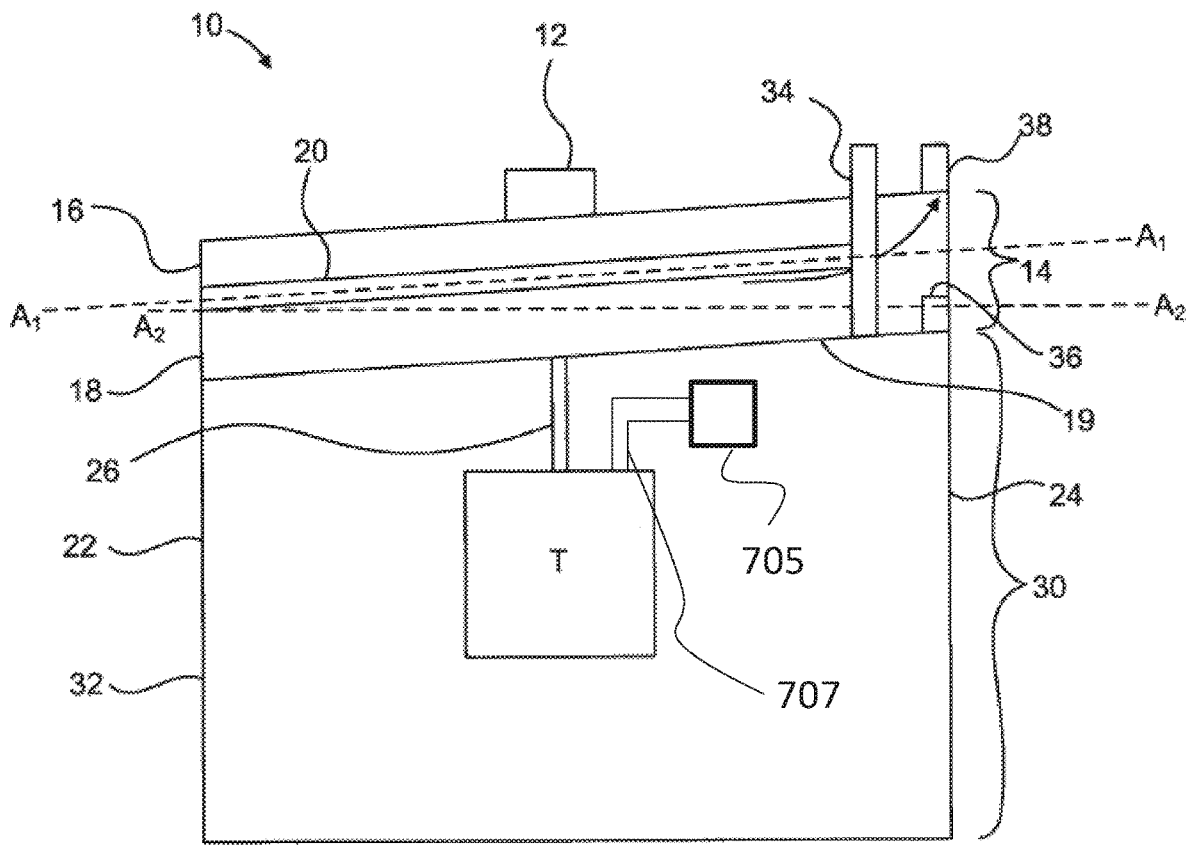
FIG. 7 shows a perfusion-type organ storage container with an expandable accumulator providing pressure control for a lumen of a stored organ.

As noted, systems of the invention are compatible with and may include any static or perfusion-type preservation apparatus. An example of such a configuration is shown in FIG. 7. An apparatus 10 is shown configured to oxygenate a perfusate (not shown) received in a pumping chamber 14 of the apparatus. The apparatus 10 includes a valve 12 configured to permit a fluid (e.g., oxygen) to be introduced into a first portion 16 of the pumping chamber 14. A membrane 20 is disposed between the first portion 16 of the pumping chamber 14 and a second portion 18 of the pumping chamber. The membrane 20 is configured to permit the flow of a gas between the first portion 16 of the pumping chamber 14 and the second portion 18 of the pumping chamber through the membrane. The membrane 20 is configured to substantially prevent the flow of a liquid between the second portion 18 of the pumping chamber 14 and the first portion 16 of the pumping chamber through the membrane. In this manner, the membrane can be characterized as being semi-permeable.

The membrane 20 is disposed within the pumping chamber 14 along an axis AI that is transverse to a horizontal axis A2. Said another way, the membrane 20 is inclined, for example, from a first side 22 to a second side 24 of the apparatus 10. As such, as described in more detail below, a rising fluid in the second portion 18 of the pumping chamber 14 will be directed by the inclined membrane 20 towards a port 38 disposed at the highest portion of the pumping chamber 14. The port 38 is configured to permit the fluid to flow from the pumping chamber 14 into the atmosphere external to the apparatus 10. In some embodiments, the port 38 is configured for unidirectional flow, and thus is configured to prevent a fluid from being introduced into the pumping chamber 14 via the port (e.g., from a source external to the apparatus 10). In some embodiments, the port 38 includes a luer lock.

The second portion 18 of the pumping chamber 14 is configured to receive a fluid. In some embodiments, for example, the second portion 18 of the pumping chamber 14 is configured to receive a liquid perfusate. The second portion 18 of the pumping chamber 14 is in fluid communication with an adapter 26. The adapter 26 is configured to permit movement of the fluid from the pumping chamber 14 to a bodily tissue T. For example, in some embodiments, the pumping chamber 14 defines an aperture (not shown) configured to be in fluidic communication with a lumen (not shown) of the adapter 26. The adapter 26 is configured to be coupled to the bodily tissue T. The adapter 26 can be coupled to the bodily tissue T in any suitable manner. For example, in some embodiments, the adapter 26 is configured to be sutured to the bodily tissue T. In another example, the adapter 26 is coupleable to the bodily tissue T via an intervening structure, such as silastic or other tubing. In some embodiments, at least a portion of the adapter 26, or the intervening structure, is configured to be inserted into the bodily tissue T. For example, in some embodiments, the lumen of the adapter 26 (or a lumen of the intervening structure) is configured to be fluidically coupled to a vessel of the bodily tissue T.

Where the tissue T is, for example a lung, the airways of the tissue T may be coupled to an expandable accumulator 705 and associated systems as described herein via an organ adapter 707 (e.g., via the trachea or bronchus).

In some embodiments, the adapter 26 is configured to support the bodily tissue T when the bodily tissue Tis coupled to the adapter. For example, in some embodiments, the adapter 26 includes a retention mechanism (not shown) configured to be disposed about at least a portion of the bodily tissue T and to help retain the bodily tissue T with respect to the adapter. The retention mechanism can be, for example, a net, a cage, a sling, or the like. In some embodiments, the apparatus 10 includes a basket (not shown) or other support mechanism configured to support the bodily tissue T when the bodily tissue T is coupled to the adapter 26 or otherwise received in the apparatus 10.

An organ chamber 30 is configured to receive the bodily tissue T and a fluid. In some embodiments, the apparatus 10 includes a port 34 that is extended through the apparatus 10 (e.g., through the pumping chamber 14) to the organ chamber 30. The port 34 is configured to permit fluid (e.g., perfusate) to be introduced to the organ chamber 30. In this manner, fluid can be introduced into the organ chamber 30 as desired by an operator of the apparatus. For example, in some embodiments, a desired amount of perfusate is introduced into the organ chamber 30 via the port 34, such as before disposing the bodily tissue T in the organ chamber 30 and/or while the bodily tissue T is received in the organ chamber. In some embodiments, the port 34 is a unidirectional port, and thus is configured to prevent the flow of fluid from the organ chamber 30 to an area external to the organ chamber through the port. In some embodiments, the port 34 includes a luer lock. The organ chamber 30 may be of any suitable volume necessary for receiving the bodily tissue T and a requisite amount of fluid for maintaining viability of the bodily tissue T. In one embodiment, for example, the volume of the organ chamber 30 is approximately 2 liters.

The organ chamber 30 is formed by a canister 32 and a bottom portion 19 of the pumping chamber 14. In a similar manner as described above with respect to the membrane 20, an upper portion of the organ chamber (defined by the bottom portion 19 of the pumping chamber 14) can be inclined from the first side 22 towards the second side 24 of the apparatus. In this manner, as described in more detail below, a rising fluid in the organ chamber 30 will be directed by the inclined upper portion of the organ chamber towards a valve 36 disposed at a highest portion of the organ chamber. The valve 36 is configured to permit a fluid to flow from the organ chamber 30 to the pumping chamber 14. The valve 36 is configured to prevent flow of a fluid from the pumping chamber 14 to the organ chamber.

The valve 36 can be any suitable valve for permitting unidirectional flow of the fluid, including, for example, a ball check valve.

The canister 32 can be constructed of any suitable material. In some embodiments, the canister 32 is constructed of a material that permits an operator of the apparatus 10 to view at least one of the bodily tissue T or the perfusate received in the organ chamber 30. For example, in some embodiments, the canister 32 is substantially transparent. In another example, in some embodiments, the canister 32 is substantially translucent. The organ chamber 30 can be of any suitable shape and/or size. For example, in some embodiments, the organ chamber 30 can have a perimeter that is substantially oblong, oval, round, square, rectangular, cylindrical, or another suitable shape.

In use, the bodily tissue T is coupled to the adapter 26. The pumping chamber 14 is coupled to the canister 32 such that the bodily tissue T is received in the organ chamber 30. In some embodiments, the pumping chamber 14 and the canister 32 are coupled such that the organ chamber 30 is hermetically sealed. A desired amount of perfusate is introduced into the organ chamber 30 via the port 34. The organ chamber 30 can be filled with the perfusate such that the perfusate volume rises to the highest portion of the organ chamber. The organ chamber 30 can be filled with an additional amount of perfusate such that the perfusate flows from the organ chamber 30 through the valve 36 into the second portion 18 of the pumping chamber 14. The organ chamber 30 can continue to be filled with additional perfusate until all atmospheric gas that initially filled the second portion 18 of the pumping chamber 14 rises along the inclined membrane 20 and escapes through the port 38. Because the gas will be expelled from the pumping chamber 14 via the port 38 before any excess perfusate is expelled (due to gas being lighter, and thus more easily expelled, than liquid), an operator of the apparatus 10 can determine that substantially all excess gas has been expelled from the pumping chamber when excess perfusate is released via the port. As such, the apparatus 10 can be characterized as self-purging. When perfusate begins to flow out of the port 38, the apparatus 10 is in a "purged" state (i.e., all atmospheric gas initially within the organ chamber 30 and the second portion 18 of the pumping chamber 14 has been replaced by perfusate).

When the purged state is reached, the operator can close both ports 34 and 38, preparing the apparatus 10 for operation.

Oxygen (or another suitable fluid, e.g., gas) is introduced into the first portion 16 of the pumping chamber 14 via the valve 12. A positive pressure generated by the introduction of oxygen into the pumping chamber 14 causes the oxygen to be diffused through the semi-permeable membrane 20 into the second portion 18 of the pumping chamber. Because oxygen is a gas, the oxygen expands to substantially fill the first portion 16 of the pumping chamber 14. As such, substantially the entire surface area of the membrane 20 between the first portion 16 and the second portion 18 of the pumping chamber 14 is used to diffuse the oxygen. The oxygen is diffused through the membrane 20 into the perfusate received in the second portion 18 of the pumping chamber 14, thereby oxygenating the perfusate.

In the presence of the positive pressure, the oxygenated perfusate is moved from the second portion 18 of the pumping chamber 14 into the bodily tissue T via the adapter 26. For example, the positive pressure can cause the perfusate to move from the pumping chamber 14 through the lumen of the adapter 26 into the vessel of the bodily tissue T. The positive pressure is also configured to help move the perfusate through the bodily tissue T such that the bodily tissue T is perfused with oxygenated perfusate.

After the perfusate is perfused through the bodily tissue T, the perfusate is received in the organ chamber 30. In this manner, the perfusate that has been perfused through the bodily tissue T is combined with perfusate previously disposed in the organ chamber 30. In some embodiments, the volume of perfusate received from the bodily tissue T following perfusion combined with the volume of perfusate previously disposed in the organ chamber 30 exceeds a volume (e.g., a maximum fluid capacity) of the organ chamber 30. A portion of the organ chamber 30 is flexible and expands to accept this excess volume. The valve 12 can then allow oxygen to vent from the first portion 16 of the pumping chamber 14, thus, reducing the pressure in the pumping chamber 14. As the pressure in the pumping chamber 14 drops, the flexible portion of the organ chamber 30 relaxes, and the excess perfusate is moved through the valve 36 into the pumping chamber 14. The cycle of oxygenating perfusate and perfusing the bodily tissue T with the oxygenated perfusate can be repeated as desired.

Figure 8:
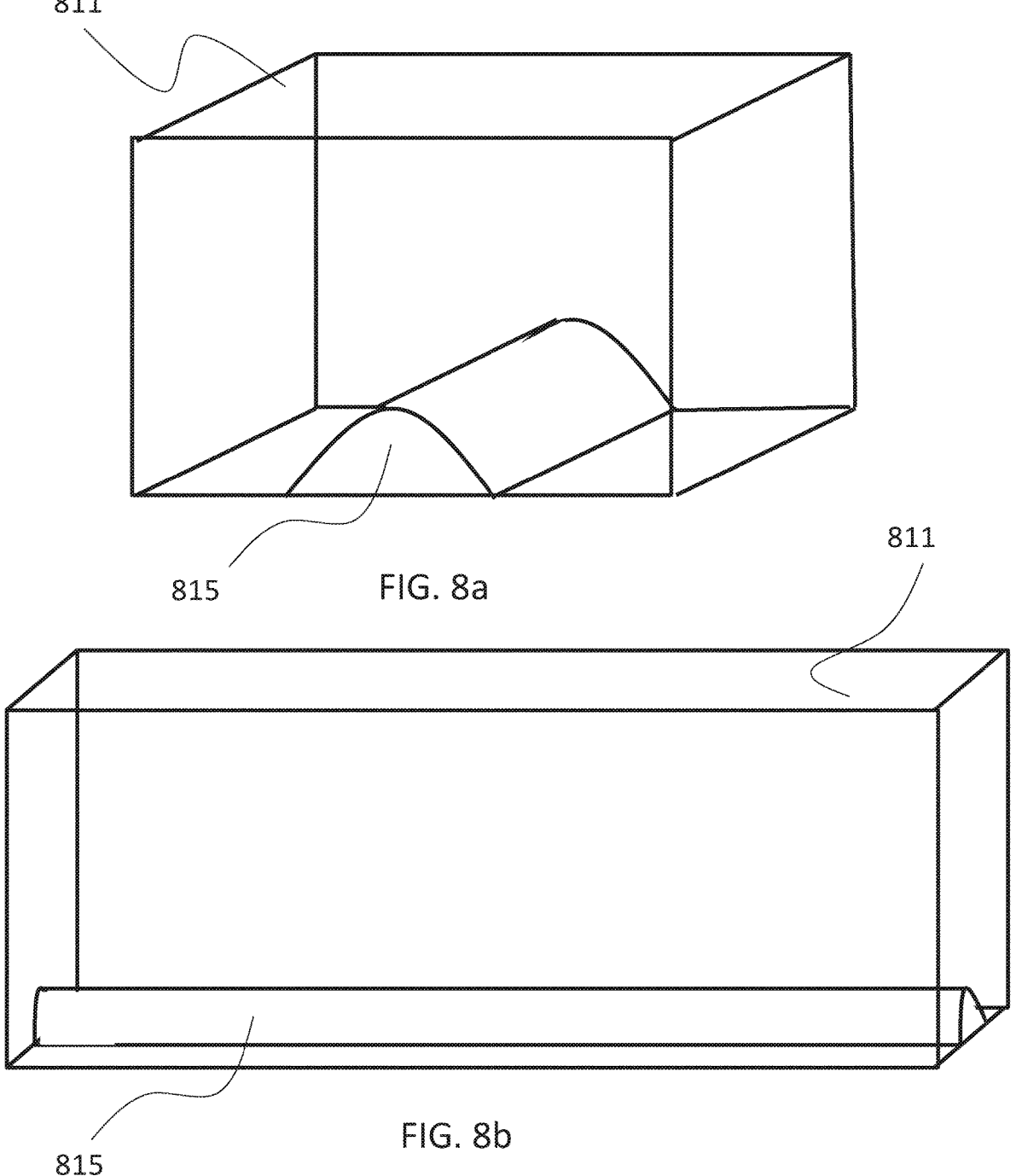
FIGS. 8A and 8B show an organ container with a raised central portion.
Figure 9:
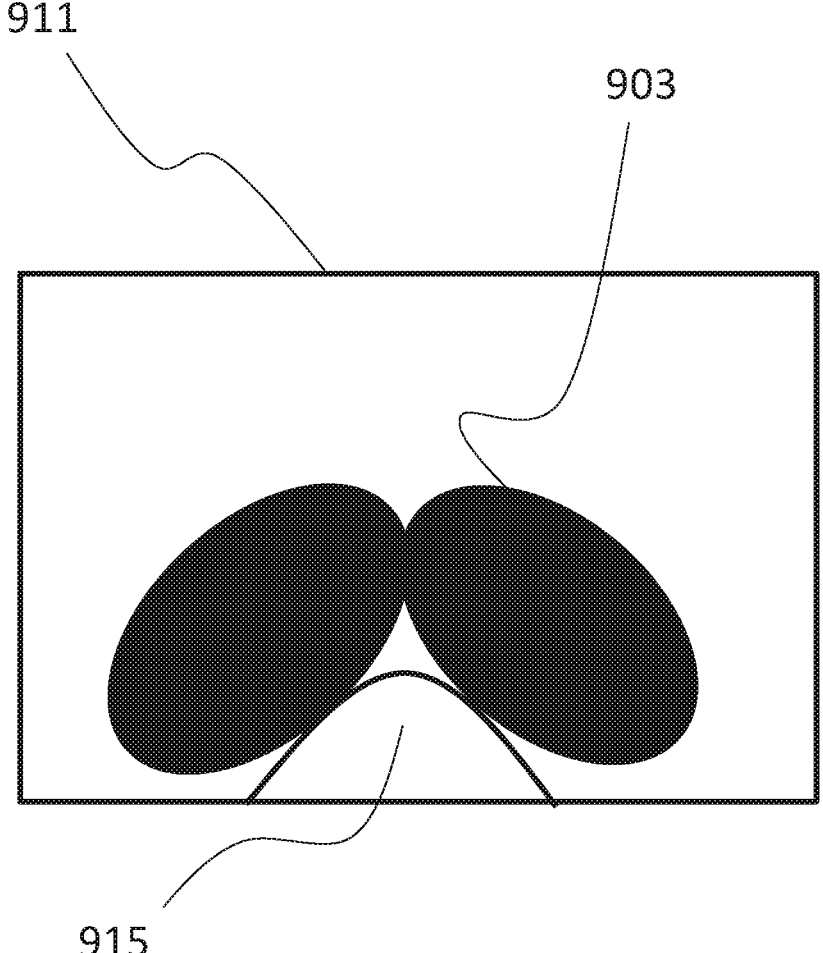
FIG. 9 shows a pair of lungs disposed on the raised central portion of an organ container

FIGS. 8A and 8B show an organ container 811 comprising a smooth raised portion 815 or saddle disposed on an interior wall of the organ container and designed to mimic the shape of the spine to replicate the in vivo environment of lungs being stored or transported. Such organ containers 811 are compatible with any other systems described herein including perfusing or static storage containers and various pressure regulating systems. FIG. 9 shows positioning of a pair of donor lungs 915 on a raised center portion 915 of an organ container 911 intended to mimic the spine in the lungs' in vivo environment.

The interior of organ containers of the invention may contain a fixed or removable shelf or tray configured to support cooling materials (e.g., frozen gel packs). Such a tray allows the organ to be loaded into the container before the tray is in place and, once the tray is inserted, the tray supports the cooling materials keeping them proximate to the organ for cooling purposes but prevents the materials from contacting the organ which can cause damage thereto. The tray may further serve to locate the organ within the colder bottom portion of the container.

The system may use any of a number of cooling media to maintain the temperature inside an insulated transport container during transport. Cooling media may comprise eutectic cooling blocks, which have been engineered to have a stable temperature between 2-10° C., for example. The cooling media can be arranged in recesses in the interior of the insulated vessel. The recesses may be a slot or the recess may be a press-fit, or the cooling media may be coupled to the walls of the insulated vessel using a snap, screw, hook and loop, or another suitable connecter. Eutectic cooling media suitable for use with the invention is available from TCP Reliable Inc. Edison, NJ 08837, as well as other suppliers. Other media, such as containerized water, containerized water-alcohol mixtures, or containerized water-glycol mixtures may also be used. The container need not be rigid, for example the cooling media may be contained in a bag which is placed in the recess. Using the cooling media, e.g. eutectic cooling blocks, the invention is capable of maintaining the temperature of the sample in the range of 2-10° C. for at least 60 minutes, e.g., for greater than 4 hours, for greater than 8 hours, for greater than 12 hours, or for greater than 16 hours.

In various embodiments, cooling blocks may include eutectic cooling media or other phase change material (PCM) such as savENRG® packs with PCM-HS01P material commercially available from RGEES, LLC or Akuratemp, LLC (Arden, NC). Exemplary PCM specifications including a freezing temperature of 0° C.+/−0.5° C., a melting temperature of 1° C.+/−0.75° C., latent heat of 310 Jig+/−10 Jig, and density of 0.95 gram/ml+/−0.05 gram/ml. Pouch dimensions may vary depending on application specifics such as tissue to be transported and the internal dimensions of the transport container and external dimensions of the tissue storage device, chamber, or canister. PCM may be included in pouches approximately 10 inches by 6 inches having approximately 230 g of PCM therein. Pouches may be approximately 8.5 mm thick and weigh about 235 g to 247 g. In some embodiments, pouches may be approximately 6.25 inches by 7.75 inches with a thickness of less than about 8.5 mm and a weight of between about 193 g and about 201 g. Other exemplary dimensions may include about 6.25 inches by about 10 inches. Pouches may be stacked or layered, for example in groups of 3 or 4 to increase the total thickness and amount of PCM. In certain embodiments, PCM containing pouches may be joined side to side to form a band of coupled PCM pouches. Such a band may be readily manipulated to wrap around the circumference of a cylindrical storage container and may have dimensions of about 6 inches by about 26 inches consisting of approximately 8 individual pouches joined together in the band. Pouches may be formed of a film for containing the PCM having a desirable moisture vapor transmission rate to avoid PCM mass loss over time. Suitable films include X2030 EVOH and nylon pouch film available from Protectall (Darien, WI) and plus plain laminate 162μ OP nylon multilayer film 350 mm available from Shrinath Rotopack Pvt. Ltd. (India).

Figure 10A:
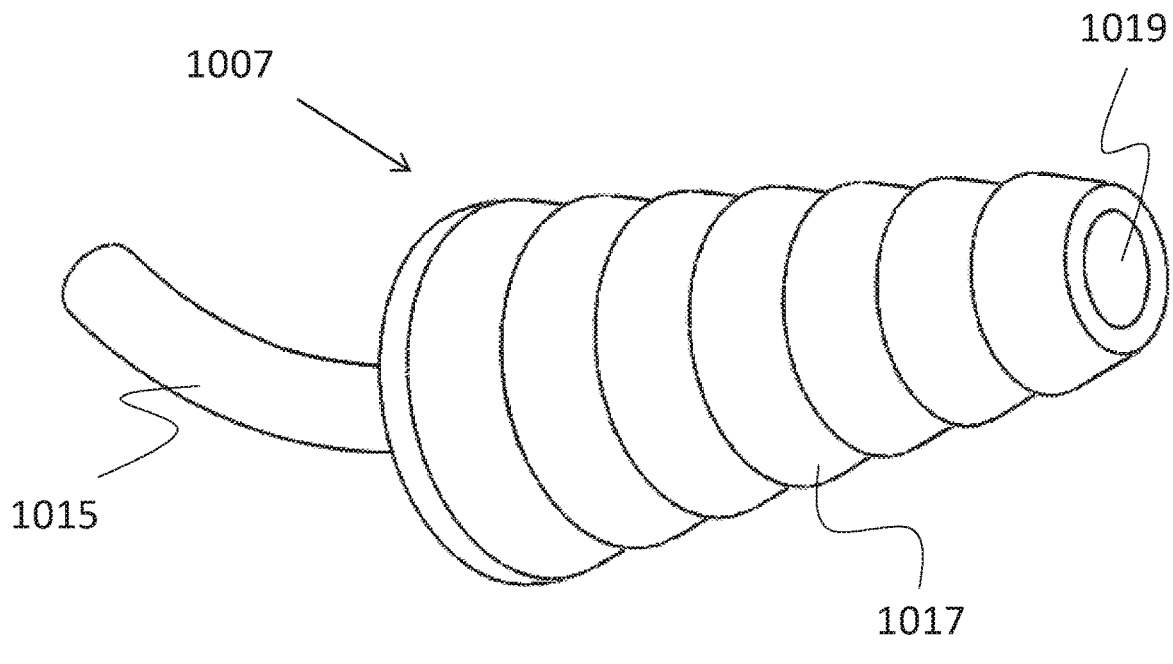
FIGS. 10A and 10B show an organ adapter.
Figure 10B:
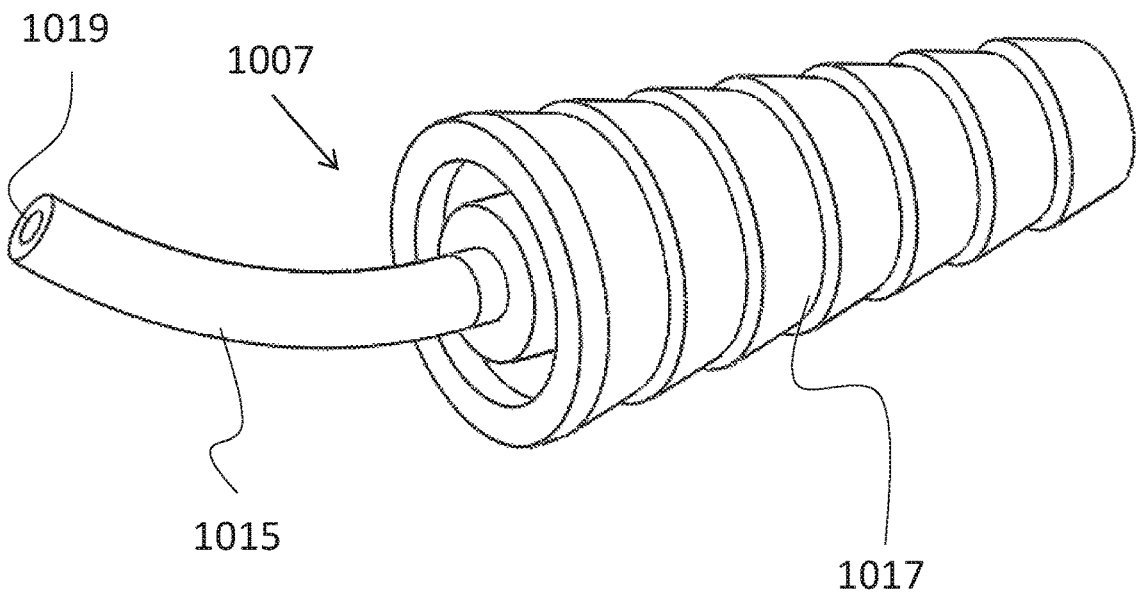

FIGS. 10A and 10B show an organ adapter 1007 configured for insertion into the trachea of a donor lung to be transported using a tissue preservation and transportation system as described above. The organ adapter 1007 may taper as shown in FIGS. 10A and 10B to form an air-tight seal against the interior surface of the trachea or other organ opening to be transported and may include ridges 1017 to aid retention of the adapter 1007 within the organ opening once inserted. The organ adapter 1007 includes tubing 1015 for connecting to an expandable accumulator as described above and includes an inner lumen 1019 for providing fluid communication between the accumulator and the interior of the organ. Once inserted into the organ, the organ adapter 1007, interior space of the organ, and the accumulator form a closed, air-tight system.

Systems of the invention may include a variety of sensors configured to sense and report, for example, temperature of the tissue, temperature of a preservation fluid or perfusate, pressure within the closed air system, pressure within the fluid, or ambient pressure. Displays for the sensors may be disposed on the outer surfaces of the organ transport or may be wirelessly linked to the internal sensors.

In some embodiments, a temperature sensor may include a probe positioned in the transport cavity and attached by a flexible cable to a temperature datalogger. The probe may not be wetted (i.e., the probe would remain outside of any sterile bags or containers) and may be suspended in air by a bracket or support in order to avoid direct contact with any cooling materials. The probe would thereby record and/or report the cavity temperature rather than the lung tissue temperature.

In certain embodiments, the sensor may comprise a mechanical flag that indicates the furthest expansion of the expandable accumulator and can therefore indicate if the accumulator reached maximum expansion presenting the possibility that additional pressure was absorbed by the lung tissue through over-inflation.

Figure 11:
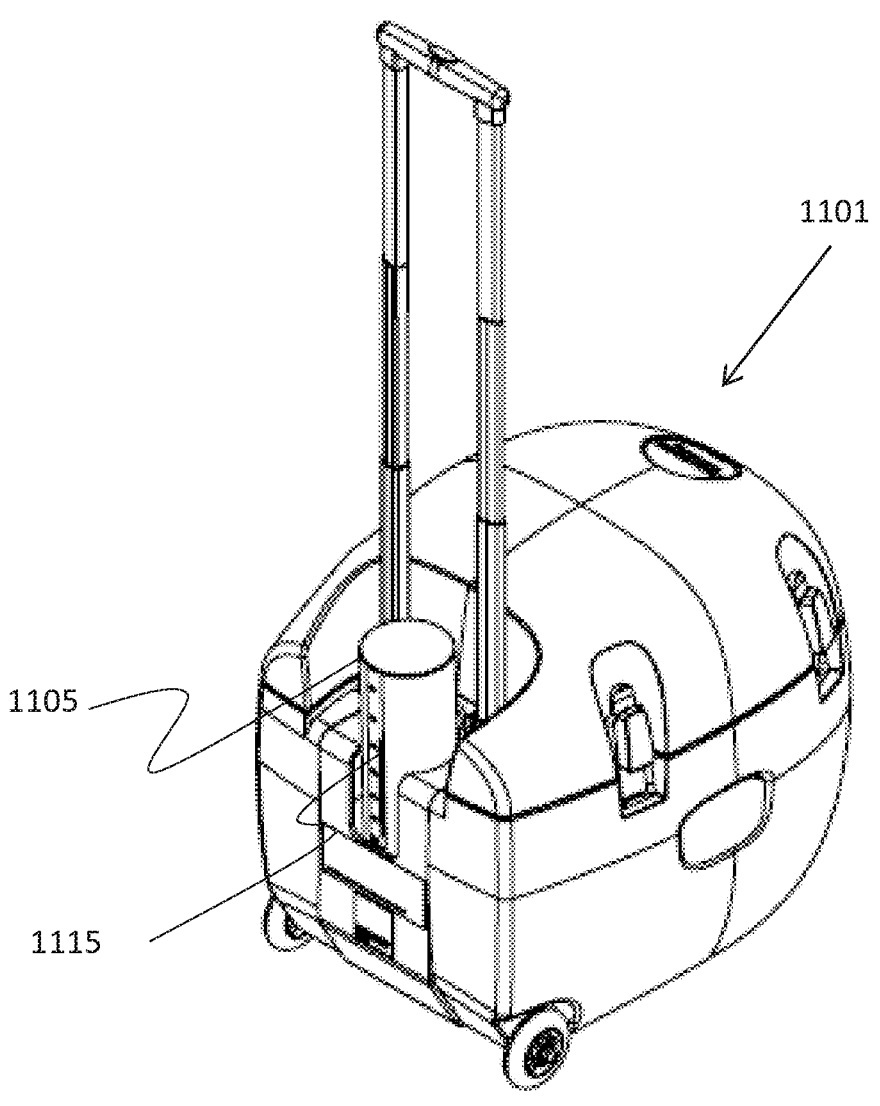
FIG. 11 shows an external view of a closed organ container with an accumulator according to certain embodiments.

FIG. 11 shows an exemplary organ container 1101 with an accumulator 1105 having an accumulator scale 1115 to indicate barometric pressure. As noted above, the indicator may be used by technicians when adjusting the accumulator to local pressure conditions.

The organ container 1101 may include a recess, port, or other feature for retaining the accumulator 1105, preferably, as shown in FIG. 11, in a position that allows for external monitoring of the accumulator 1105. The organ container may include wheels and an extendable handle as shown for ease of transport and storage.

Figure 12:
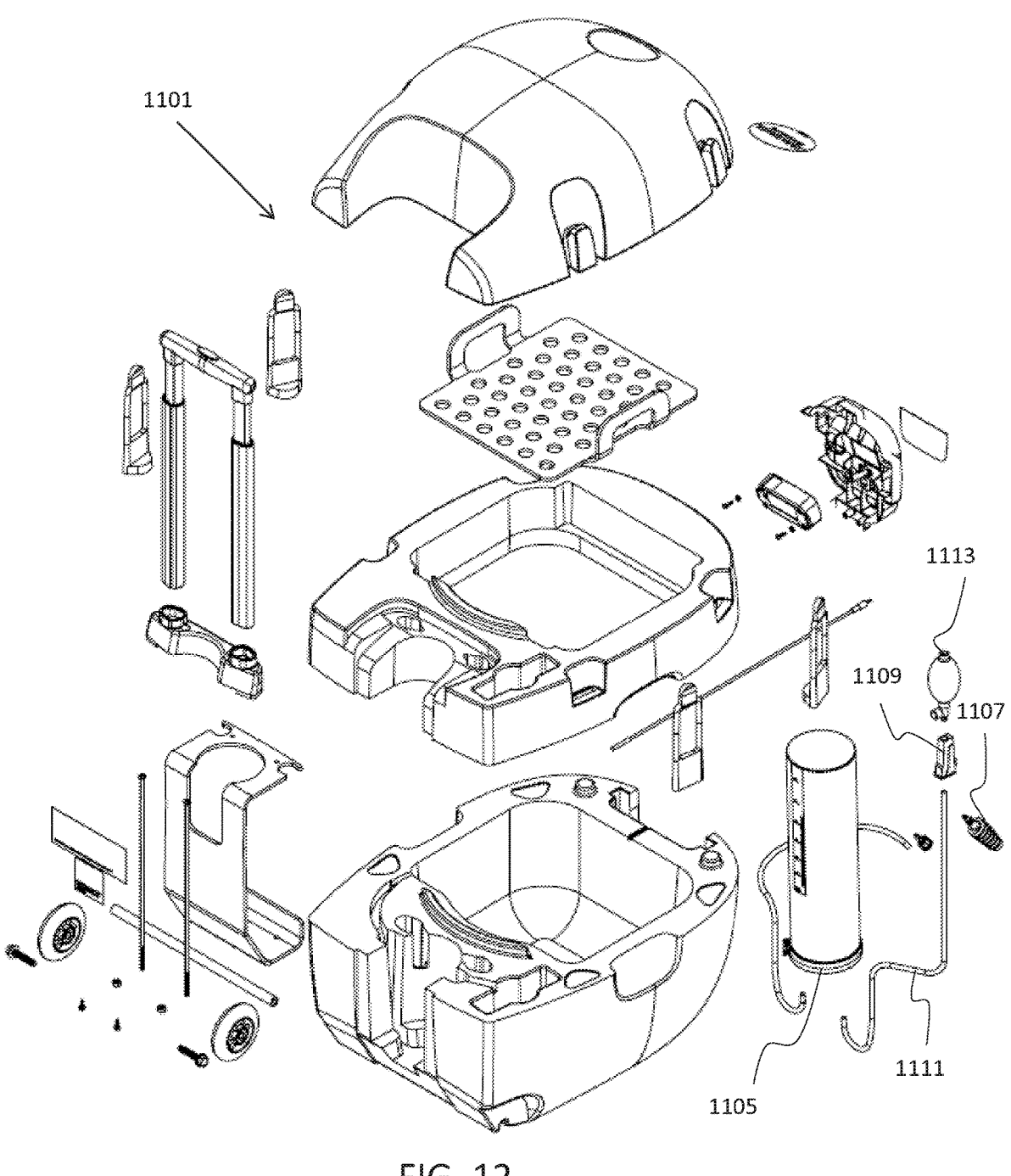
FIG. 12 shows an exploded view of an organ container with an accumulator according to certain embodiments.

FIG. 12 shows an exploded view of an exemplary organ container 1101. The organ container 1101 features an accumulator 1105, a gas source 1113 (e.g., a bulb) for pressurizing the system, and an organ adapter 1107 (e.g., a trachea plug) for interfacing an organ with the system. The organ container 1101 also includes tubing 1111 or connectors for coupling the gas source 1113 and the organ adapter 1107 to the accumulator 1105. The organ container 1101 may also use a valve 1109 (e.g., a roller clamp) operable to regulate fluid communication between the gas source 1113 and the accumulator 1105 by, for example, acting on the tubing 1111.

Figure 13:
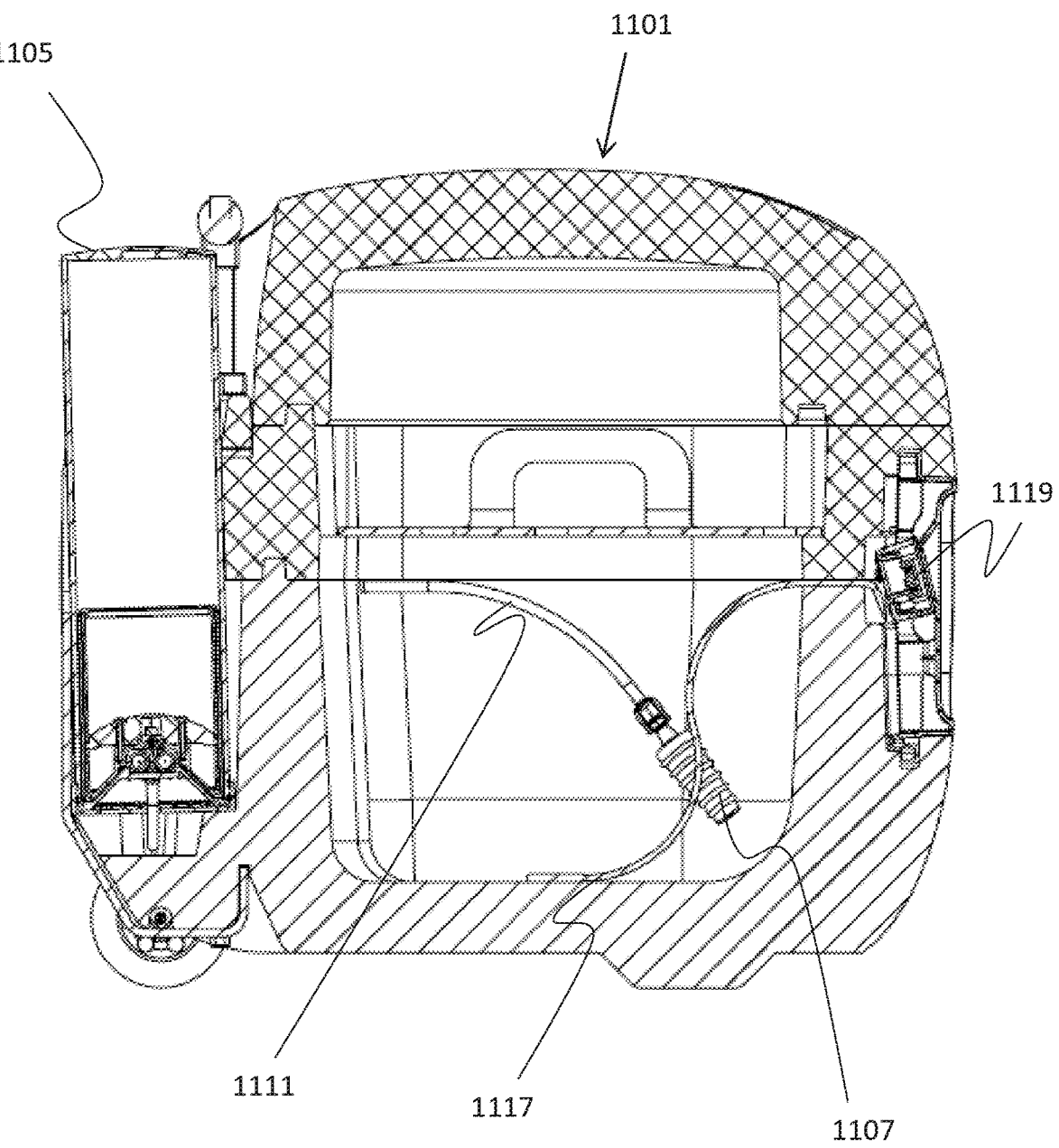
FIG. 13 shows a cross-sectional view of a closed organ container with an accumulator according to certain embodiments.

FIG. 13 shows a cross-sectional view of an exemplary organ container 1101 illustrating an exemplary configuration of various components described herein including an accumulator 1105 an organ adapter 1107 (not coupled to an organ) and connecting tubing 1111. A sensor 1117 (e.g., a temperature sensor) as described above, is also included at the bottom of the organ camber and, while potentially wireless in some embodiments, is depicted in FIG. 13 in a wired format in electronic communication with an external display 1119 (e.g., an LCD screen) to display data obtained from the sensor 1117. An organ such as a lung would rest on the bottom of the cavity.

Figure 14:
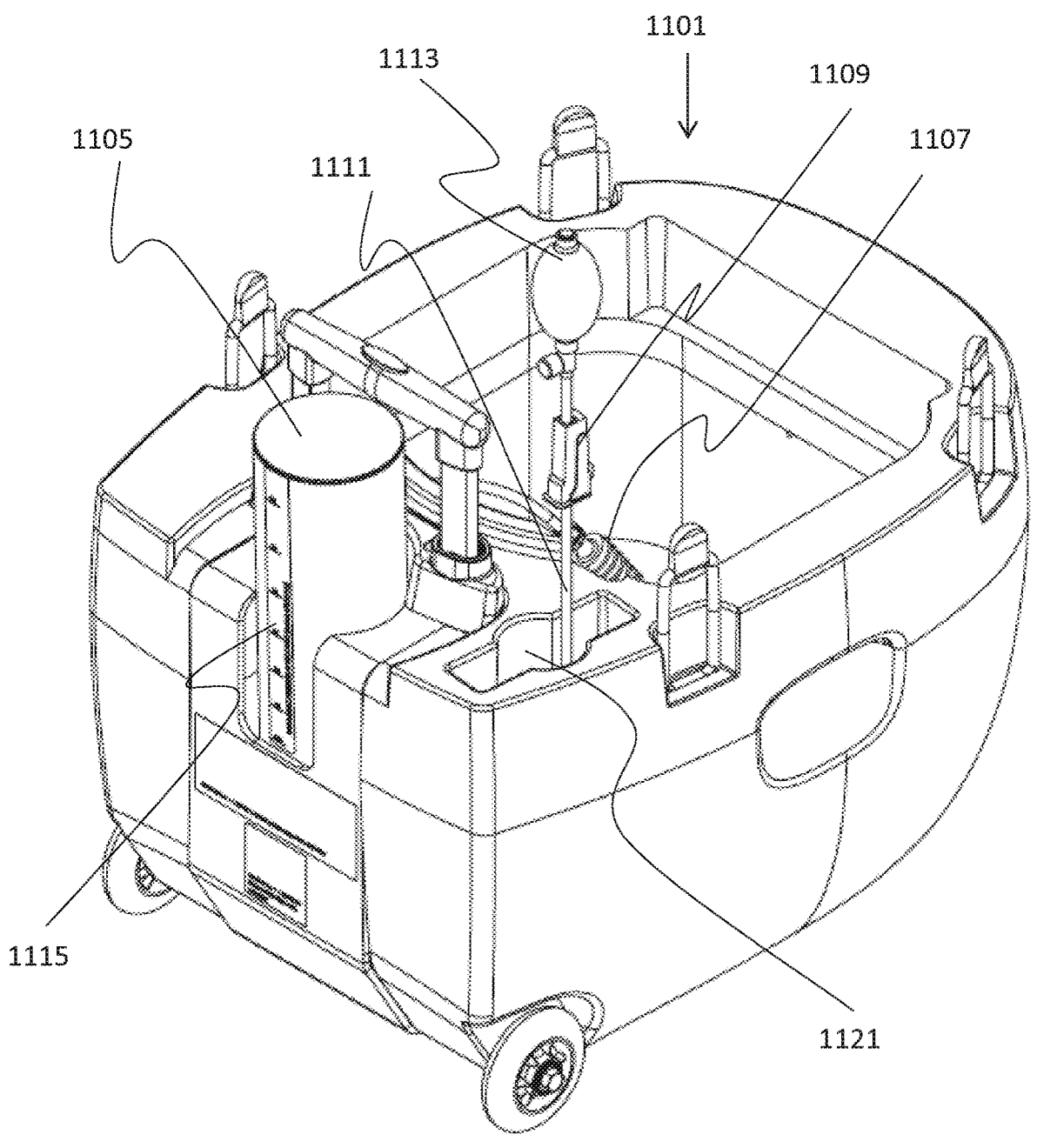
FIG. 14 shows an external view of an open organ container with an accumulator according to certain embodiments.

FIG. 14 shows an external view of an open organ container 1101 with an accumulator 1105 according to certain embodiments. With the lid removed from the exemplary organ container 1101, it is ready to accept or deliver an organ. The accumulator 1105 with a pressure indicator 1115 is shown placed in a fitted receptacle on the organ container 1101. A gas source 1113 is connected by tubing 1111 to the accumulator 1105 and that connection is regulated by a valve 1109. The organ container 1101 also features a storage pocket 1121 for receiving and storing the gas source 1113, valve 1109, and tubing 1111 when not in use. The illustrated organ container 1101 does not have an organ loaded and so the organ adapter 1107 inside the cavity is seen.

Figure 15:
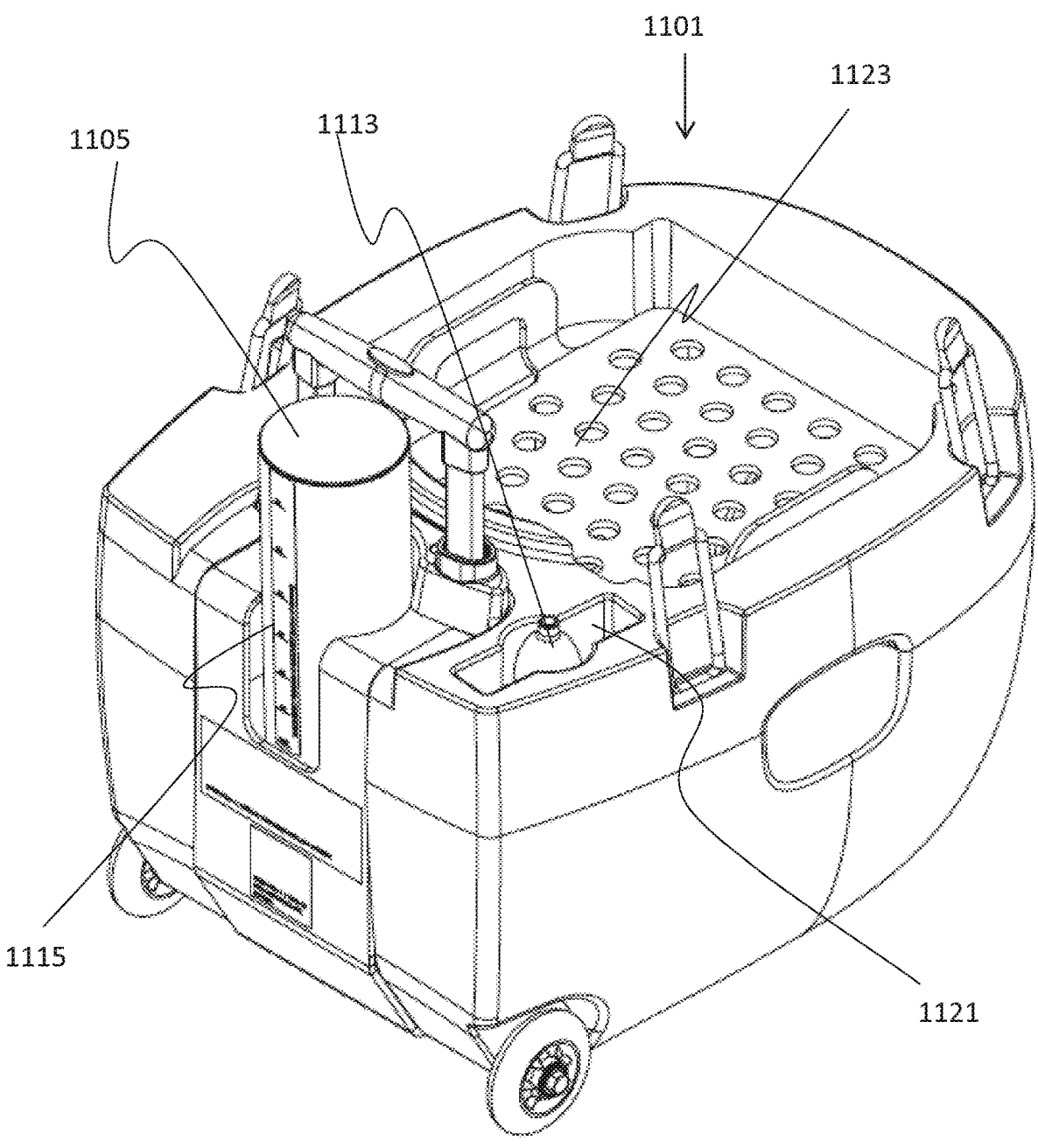
FIG. 15 shows an external view of an open organ container with an accumulator and a support tray according to certain embodiments.

FIG. 15 shows an external view of an open organ container 1101 with an accumulator 1105 with pressure indicator 1115. A tray 1123 is adapted to be positioned above a loaded organ in the cavity of the organ container 1101 to hold cooling materials such as frozen gel packs off of the organ tissue surface. The tray may be supported by, for example, indentions in the interior walls of the cavity. The gas source 1113 is shown stored in the storage pocket 1121 for transport.

Figure 16:
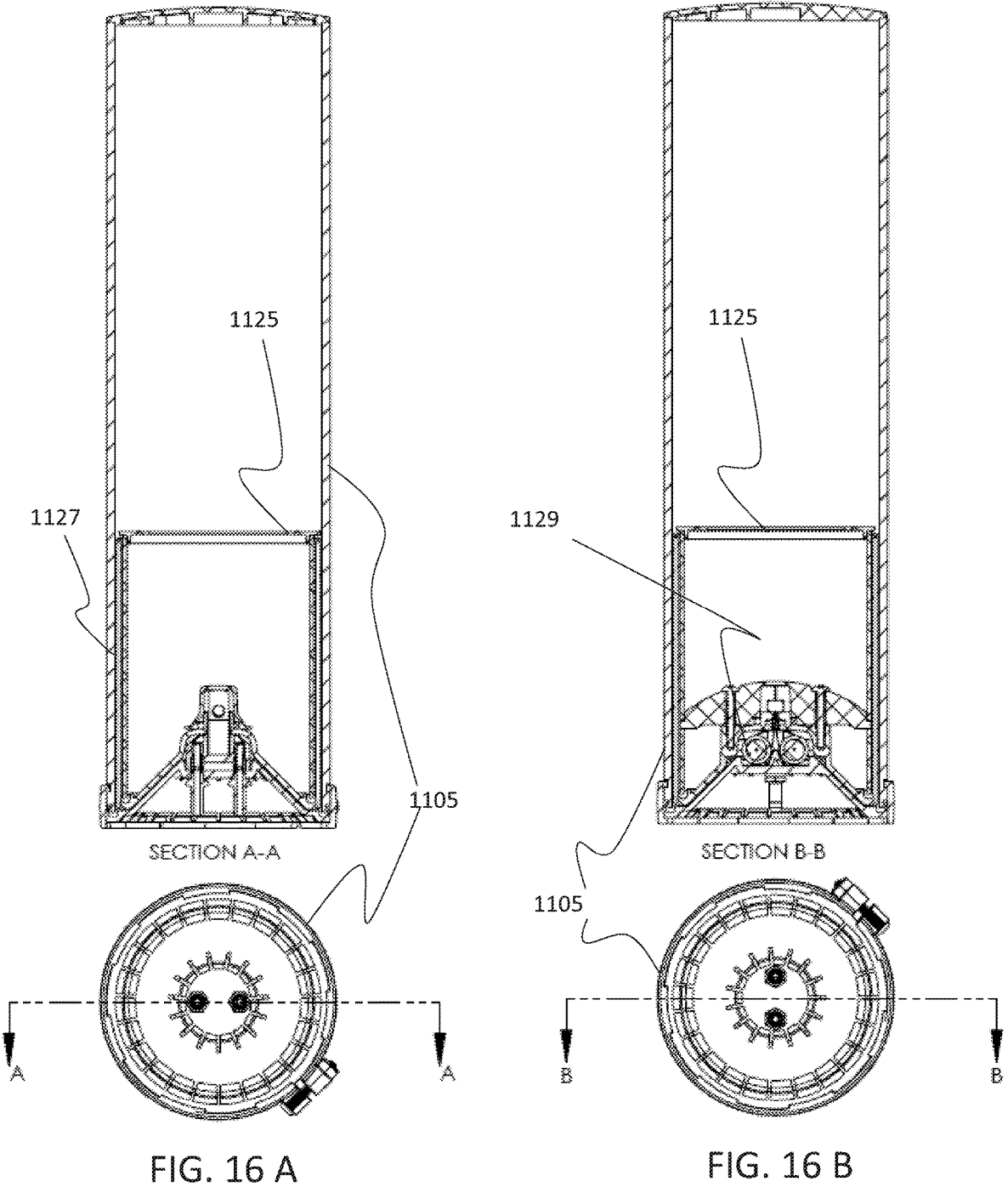
FIG. 16A shows a transverse cross-sectional view of an approximately empty accumulator according to certain embodiments.
FIG. 16B shows a lateral cross-sectional view of an approximately empty accumulator according to certain embodiments.

FIG. 16A shows a transverse cross-sectional view of an approximately empty accumulator 1105 according to certain embodiments and FIG. 16B shows a lateral cross-sectional view. The accumulator 1105 includes a piston 1125 and a rolling diaphragm 1127 as described above. As seen in FIG. 16B, a pair of back-to-back constant force springs 1129 comprising rolled ribbons of, for example, spring steel.

Figures 17, 18:
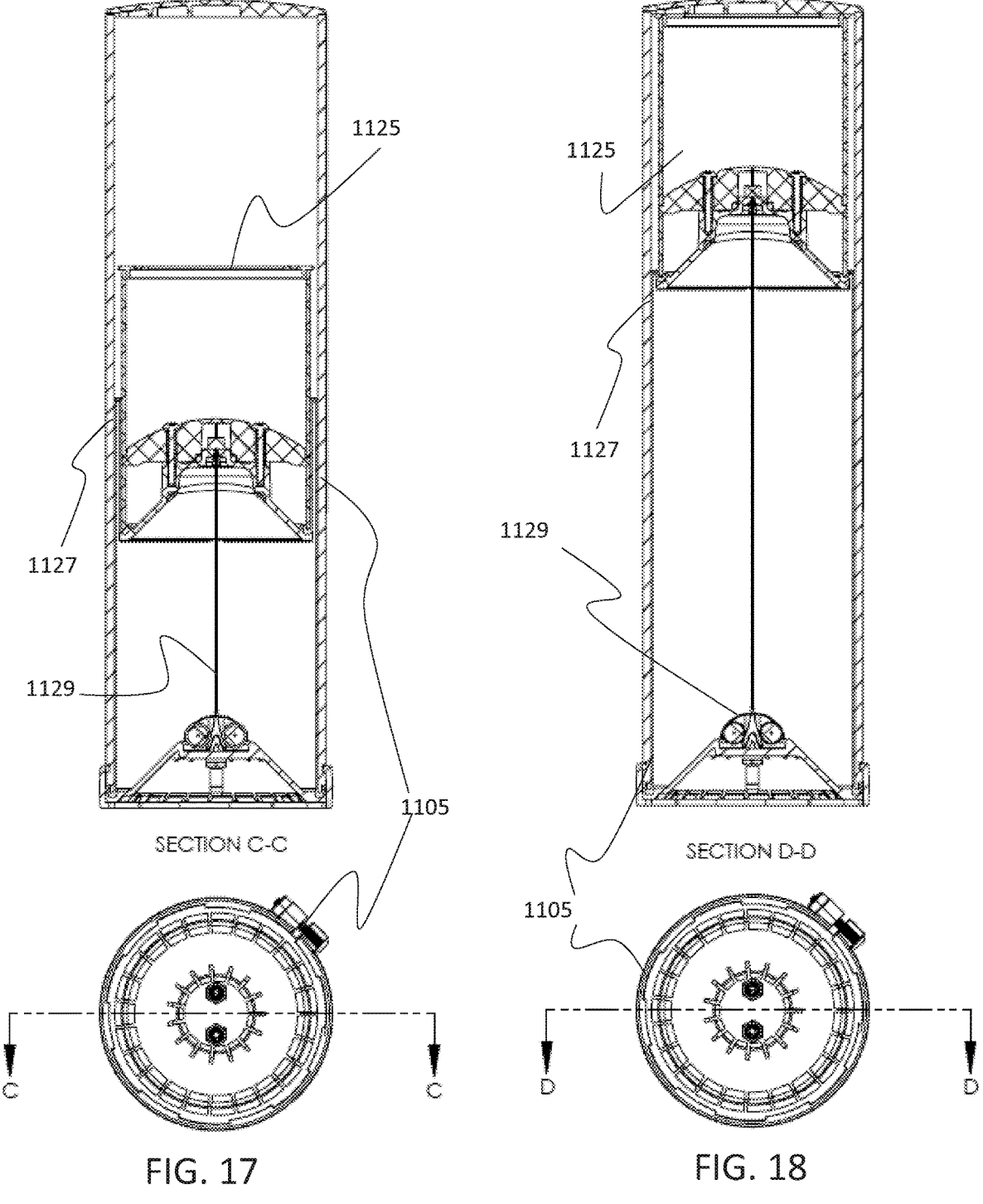
FIG. 17 shows a lateral cross-sectional view of an approximately half full accumulator according to certain embodiments.
FIG. 18 shows a lateral cross-sectional view of an approximately full accumulator according to certain embodiments.

FIG. 17 shows a lateral cross-sectional view of an approximately half full accumulator 1105 and FIG. 18 shows a lateral cross-sectional view of an approximately full accumulator 1105. As seen in FIGS. 16B-18, as the accumulator 1105 is filled or expands, the rolling diaphragm 1127 unfolds while the ribbons of the constant force springs 1129 unwind thereby providing resistance against said expansion. As noted earlier, the rolling diaphragm 1127 helps maintain a seal between the outer surface of the piston 1125 and the inner wall of the accumulator 1105 while minimizing friction between the two surfaces that might interfere with the expansion or operation of the accumulator 1105.

Figure 19:
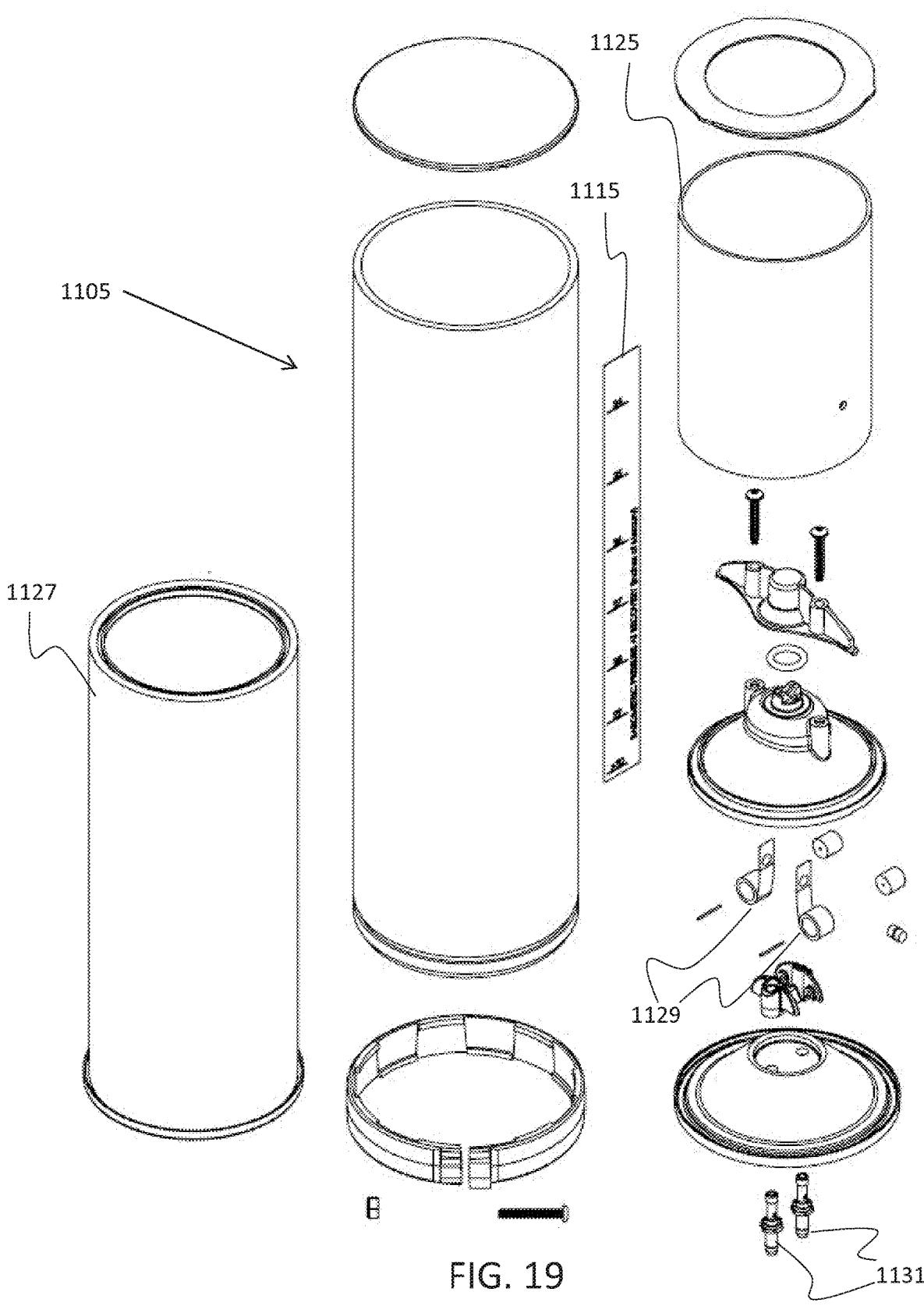
FIG. 19 shows an exploded view of an accumulator according to certain embodiments.

FIG. 19 shows an exploded view of an accumulator 1105. The outer barrel of the accumulator 1105 may be constructed of a material such as polycarbonate plastic and is preferably transparent enough for the position of the piston 1125 therein to be externally readable against a pressure indicator 1115 on the accumulator 1105. For example, the top edge of the piston 1125 may align with a mark on the pressure indicator 1115 to indicate a pressure setting. A clear outer barrel may also allow for monitoring of the state of the piston 1125 within the accumulator 1105 during transport to observe, for example, a maximum displacement thereof. FIG. 19 shows a pair of constant force springs 1129 and a pair of connectors 1131 configured to couple to tubing to provide fluid communication between the interior of the accumulator 1105 and a gas source and an organ via an organ adapter.

As one skilled in the art would recognize as necessary or best-suited for the systems and methods of the invention, systems and methods of the invention may include computers that may include one or more of processor (e.g., a central processing unit (CPU), a graphics processing unit (GPU), etc.), computer-readable storage device (e.g., main memory, static memory, etc.), or combinations thereof which communicate with each other via a bus.

Computers may include mobile devices (e.g., cell phones), personal computers, and server computers. In various embodiments, computers may be configured to communicate with one another via a network in order to display image series or allow remote storage, viewing, or selection of images of a given series.

A processor may include any suitable processor known in the art, such as the processor sold under the trademark XEON® E7 by Intel (Santa Clara, CA) or the processor sold under the trademark OPTERON® 6200 by AMD (Sunnyvale, CA).

Memory preferably includes at least one tangible, non-transitory medium capable of storing: one or more sets of instructions executable to cause the system to perform functions described herein (e.g., software embodying any methodology or function found herein); data (e.g., portions of the tangible medium newly re-arranged to represent real world physical objects of interest accessible as, for example, a picture of an object like a motorcycle); or both. While the computer-readable storage device can in an exemplary embodiment be a single medium, the term "computer-readable storage device" should be taken to include a single medium or multiple media (e.g., a centralized or distributed database, and/or associated caches and servers) that store the instructions or data. The term "computer-readable storage device" shall accordingly be taken to include, without limit, solid-state memories (e.g., subscriber identity module (SIM) card, secure digital card (SD card), micro SD card, or solid-state drive (SSD)), optical and magnetic media, hard drives, disk drives, and any other tangible storage media.

Input/output devices according to the invention may include one or more of a video display unit (e.g., a liquid crystal display (LCD) or a cathode ray tube (CRT) monitor), an alphanumeric input device (e.g., a keyboard), any temperature, pressure, or other sensor described herein, a cursor control device (e.g., a mouse or trackpad), a disk drive unit, a signal generation device (e.g., a speaker), a touchscreen, a button, an accelerometer, a microphone, a cellular radio frequency antenna, a network interface device, which can be, for example, a network interface card (NIC), Wi-Fi card, or cellular modem, or any combination thereof.

One of skill in the art will recognize that any suitable development environment or programming language may be employed to allow the operability described herein for various systems and methods of the invention. For example, systems and methods herein can be implemented using Per, Python, C++, C#, Java, JavaScript, Visual Basic, Ruby on Rails, Groovy and Grails, or any other suitable tool. For a computer, it may be preferred to use native xCode or Android Java.

EXAMPLES

Example 1—Modeling of Lung Pressure Changes During Transport

Lung volume and pressure conditions were modeled during transport without an accumulator, with a spring-based accumulator, and with a weight based accumulator (as described above). Since PV=nRT (ideal gas law) the trapped volume inside the lung will obey pV/T=constant or $p_f V_f/T_f = P_o V_o/T_o$ where "0" refers to starting and "f" to final conditions.

P is the atmospheric pressure, absolute. p is the internal pressure, absolute, biased somewhat above P. V is the contained volume (lung, tubing, accumulator) T is the temperature in Kelvin.

For pressure the model defines and uses cmH20 and atm (the SI unit standard).

Pressure measurements are absolute unless otherwise stated.

$$cmH2O \equiv \frac{gm \cdot g}{cm^2}$$

$$1\ atm = 1.033 \times 10^3 \cdot cmH2O$$

$$1\ atm = 14.696 \cdot psi$$

Ambient Condition Ranges:

Ambient Pressure (P) can range between the following (note that weather measurements are usually in inHg):

$$1\ atm = 29.921 \cdot in\_Hg$$

$$Patm_{min} := 25.69\ in\_Hg = 0.859 \cdot atm$$

$$Patm_{max} := 32.06\ in\_Hg = 1.071 \cdot atm$$

Altitude at recovery should be accounted for. For example, the typical pressure in a city such as Denver, Colorado may be calculated as:

$$p_{atmosphere}(h) := 1\ atm \cdot exp\left(\frac{-g \cdot 0.0289644\ \frac{kg}{mol} \cdot h}{8.31447\ \frac{J}{K \cdot mol} 288.15K}\right)$$

$$P_{atmosphere}(5280\ ft) := 0.86\ atm$$

The range of $P_o$ is from ~0.8 to ~1.08 atm. Lung temperature (T) can range between the following (assumes that recovery occurs in cold operating rooms and transport is under not as cold conditions):

$$T_{o\_min} := 2°\ C. = 275.15K\ and\ T_{o\_max} := 65°\ F. = 291.483K$$

Travel Conditions:

To model transit conditions, it is assumed that T stays approximately constant. Allowing $T_f$ to rise to 8° C. is conservative. Extremes of pressure will be seen in airplane cabins and is approximated as follows for various aircraft (Cabin Pressure is typically measured in equivalent altitude):

Regulatory Maximum = 2400 m ($p_{atmosphere}$(2400 m) = 0.752 atm)

Boeing 767 =

2100 m ($p_{atmosphere}$(2100 m) = 0.780 atm) (typical of older airlines)

Airbus A380 = 1868 m ($p_{atmosphere}$(1868 m) = 0.801 atm)

Boeing 747–400 = 1572 m ($p_{atmosphere}$(1572 m) = 0.830 atm)

So flight pressures can range from 0.752 up to 0.830 atm.

Range Values for Exploring Solution Space:

i==0 . . . 50 (where i is the ambient pressure index); j==0 . . . 2 (where j is the initial conditions index for solutions of multiple cases simultaneously); $P_{min}$:=0.75 atm and $P_{max}$:=1.10 atm $$P_{travel_i} := \frac{P_{max} - P_{min}}{50} \cdot i$$

Lung Parameters:

The lung values used herein are taken from literature. The volumes at 40 cmH2O and above are extrapolated. The resulting interpolated lung pressure-volume model is large: volume is 4.74 liters at 15cmH2O. The pressure-volume model was scaled to establish a resting volume of 3.5 L at 15cmH2O.

$$\begin{pmatrix} -20 \\ -16 \\ -12 \\ -8 \\ -4 \\ 0 \\ 8 \\ 12 \\ 16 \\ 20 \\ 24 \\ 28 \\ 32 \\ 36 \\ 40 \\ 50 \\ 60 \\ 70 \\ 85 \\ 100 \end{pmatrix} = cmH2O \quad Lung_v := \begin{pmatrix} 0.600 \\ 0.635 \\ 0.670 \\ 0.695 \\ 0.710 \\ 0.815 \\ 1.100 \\ 2.400 \\ 3.900 \\ 4.600 \\ 5.040 \\ 5.250 \\ 5.370 \\ 5.470 \\ 5.500 \\ 5.525 \\ 5.543754952 \\ 5.557634961 \\ 5.567219684 \\ 5.572870767 \end{pmatrix} L$$

$V_{rest}$:=3.5 L; $P_{rest}$:=15cmH20
LungV (p, P):=interp[Ispline(Lung$_p$, Lung$_v$), Lung$_p$, Lung$_v$, (p–P)]
LungV($P_{rest}$, 0 cmH20)=4.474 L
Vlung$_{max}$:=5 L (this simulates a volume constraint from a perfectly rigid lung)
The scaled, max-limited Lung Volume formula is then:

$$V_{lung}(p, P) := \left(Vlung_{max}, LungV(p, P) \cdot \frac{V_{rest}}{LungV(P_{rest},\ 0\ cmH2O)}\right)$$

(where p=internal and P=external pressure, absolute)

A graph of the lung curve can be modeled using the following equation:

$$\Delta Plung_{min} = \min(Lung_p) = -20 \cdot cmH2O$$

$$\Delta Plung_{max} = \max(Lung_p) = 100 \cdot cmH2O$$

$$\Delta Plung_i := \Delta Plung_{min} + \frac{(\Delta Plung_{max} - \Delta Plung_{min})}{50} \cdot i$$

A graph of the target volume, pressure and target compliance can be created as follows:

$$K_{target} := \frac{200 \ ml}{cmH2O}$$

$$TargetLineY := \begin{pmatrix} 10 \ L \\ V_{rest} \\ -1 \ L \end{pmatrix}$$

$$TargetLineX := \begin{bmatrix} P_{rest} + \frac{(TargetLineY_0 - V_{rest})}{K_{target}} \\ P_{rest} \\ P_{rest} + \frac{(TargetLineY_2 - V_{rest})}{K_{target}} \end{bmatrix}$$

Figure 20:
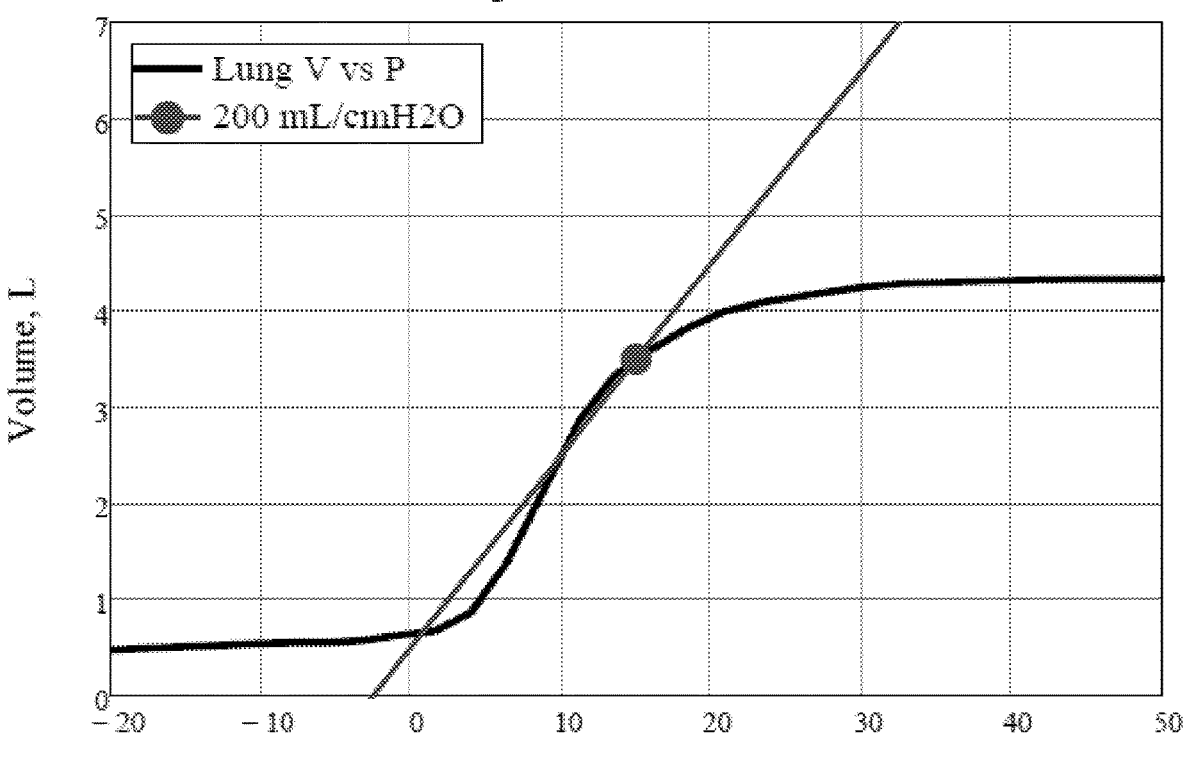
FIG. 20 shows a pressure vs. volume curve for an ex-vivo lung model.

The curve of an ex-vivo lung model, volume vs. pressure is shown in FIG. 20. The target shown is a lung volume of 3.5 L at 15cmH2O. The curve is taken from literature and scaled (on Yaxis) to pass through target Values for pressure>36 cmH2O are extrapolated.

Accumulator parameters for the model were varied based on the accumulator used as follows:

1) No Accumulator:

AccumPresent=0 (When this is zero, there's no accumulator in the system).

$Vacmltr_{min}$=50 mL $Vacmltr_{max}$=1500.0 mL (These values represent the designed volume range)

$$Vacmltr_{recovery} = \begin{pmatrix} 1.000 \\ 0.350 \\ 0.050 \end{pmatrix} \cdot L$$

(this is set by the recovery team, e.g. system is filled with air until accumulator is at the stipulated volume, which may vary based on ambient pressure at time/place of recovery)

$$Kacmltr = 400.0 \cdot \frac{mL}{cmH2O}$$

(Higher numbers here represent a weight-loaded design; lower numbers represent a spring-loaded design)

$$\Delta P_{acmltr} = 15 \cdot cmH2O$$

(This is the normal accumulator pressure, at $Vacmltr_{recover1}$, e.g., when the piston is at the target volume for the nominal pressure case. It is set by the weight or spring)

$$V_{acmltr}(p, P) := \max[Vacmltr_{min}, , \min[Vacmltr_{max}, Vacmltr_{recovery_1} +$$

$$Kacmltr \cdot (p - P - \Delta P_{acmltr})]]$$

$$Hacmltr_{max} := 20 \ cm$$

$$Hacmltr_{max} := 7.874 \ in$$

$$Dacltr := \sqrt{\frac{4 Vacmltr_{max}}{\pi \cdot Hacmltr_{max}}} = 9.772 \cdot cm$$

$$F_{spring_{min}} := \Delta P_{amcltr} \cdot \frac{\pi}{4} \cdot Dacltr^2 = 2.48 \cdot lbf$$

$$Fspring_{max} :=$$

$$Fspring_{min} + \frac{(Vacmltr_{max} - Vacmltr_{min})}{Kacmltr} \cdot \left(\frac{\pi}{4} \cdot Dacltr^2\right) = 3.08 \cdot lbf$$

$$Kspring := \frac{Fspring_{max} - Fspring_{min}}{Hacmltr_{max}} = 0.076 \cdot \frac{lbf}{in}$$

$Hspring_{min} := 1 \ in$ (This is the spring height at max compression)

$$Hspring_{free} := Hspring_{min} + Hacmltr_{max} + \frac{Fspring_{min}}{Kspring} = 41.456 \cdot in$$

This is the free height of the spring and not meaningful for weight-biased designs)

2) Spring-Based Accumulator:

Parameters are same as for no accumulator above aside from the following:

$$AccumPresent = 1$$

$$Kacmltr = 350.0 \cdot \frac{mL}{cmH2O}$$

$$Fspring_{max} :=$$

$$Fspring_{min} + \frac{(Vacmltr_{max} - Vacmltr_{min})}{Kacmltr} \cdot \left(\frac{\pi}{4} \cdot Dacltr^2\right) = 3.165 \cdot lbf$$

$$Kspring := \frac{(Fspring_{max} - Fspring_{min})}{Hacmltr_{max}} = 0.087 \cdot \frac{lbf}{in}$$

$$Hspring_{free} := Hspring_{min} + Hacmltr_{max} + \frac{Fspring_{min}}{Kspring} = 37.383 \cdot in$$

3) Weight-Based Accumulator:

Parameters are same as for no accumulator above aside from the following $$AccumPresent = 1$$

$$Vacmltr_{recovery} = \begin{pmatrix} 0.900 \\ 0.300 \\ 0.010 \end{pmatrix} \cdot L$$

$$Kacmltr = 10000.0 \cdot \frac{mL}{cmH2O}$$

$$Fspring_{max} :=$$

$$Fspring_{min} + \frac{(Vacmltr_{max} - Vacmltr_{min})}{Kacmltr} \cdot \left(\frac{\pi}{4} \cdot Dacltr^2\right) = 2.504 \cdot lbf$$

$$Kspring := \frac{Fspring_{max} - Fspring_{min}}{Hacmltr_{max}} = 3.045 \times 10^{-3} \frac{lbf}{in}$$

$$Hspring_{free} := Hspring_{min} + Hacmltr_{max} + \frac{Fspring_{min}}{Kspring} = 823.427 \cdot in$$

Initial Conditions:

$$T_O = \begin{bmatrix} 4 \\ 4 \\ 4 \end{bmatrix} °C. \quad P_O = \begin{bmatrix} 0.860 \\ 1.000 \\ 1.080 \end{bmatrix} atm$$

where $P_o$ is the external environmental pressure.

The accumulator's behavior was used to determine $p_o$ and $V_o$, e.g., the initial internal pressure volume at the above $P_o$ and $T_o$ given all other parameters. The accumulator is filled to the target volume, which sets the internal pressure.

$$p_o := \frac{Vacmltr_{recovery}}{Kacmltr} \cdot 0 + \Delta P_{amcltr} + P_o =$$

$$\begin{pmatrix} 903.576 \\ 1048.227 \\ 1130.886 \end{pmatrix} \cdot \text{cmH2C} \, p_o - P_o = \begin{pmatrix} 15 \\ 15 \\ 15 \end{pmatrix} \cdot \text{cmH2O}$$

The lung volume was determined by the initial and external pressures as:

$$Vlung_{initial} = V_{lung}(p_o, P_o) = 3.5L$$

The Contained Volume $V_o$ is the sum of accumulator and lung volumes. This is the initial volume of air inside the system. This mass of air will remain unchanged, so the ideal gas law governs its subsequent behavior (relationship of pressure to volume). $V_o$ can be defined as follows for the various accumulator types:

No Accumulator:

$$V_o := AccumPresent \cdot Vacmltr_{recovery} + Vlung_{initial} = \begin{pmatrix} 3.500 \\ 3.500 \\ 3.500 \end{pmatrix} L$$

Spring-Based Accumulator:

$$V_o := AccumPresent \cdot Vacmltr_{recovery} + Vlung_{initial} = \begin{pmatrix} 4.500 \\ 3.850 \\ 3.550 \end{pmatrix} L$$

Weight-Based Accumulator:

$$V_o := AccumPresent \cdot Vacmltr_{recovery} + Vlung_{initial} = \begin{pmatrix} 4.400 \\ 3.800 \\ 3.510 \end{pmatrix} L$$

The equation for final volume Vr is based on the ideal gas law for contained volume, $$\frac{p_f \cdot V_f}{T_f} = \frac{p_o \cdot V_o}{T_o}$$

solved for Vf:

$$V_f = \frac{p_o \cdot V_o}{T_o} \cdot \frac{T_f}{p_f}$$

The adapted equation was used in the solve function below:

$$p_{guess} := 1.2 \cdot p_{o_2}$$

given:

$$\frac{po \cdot Vo}{To} \cdot \frac{Tf}{P_{uesss}} =$$

$$AccumPresent \cdot V_{acmltr}(p_{guess}, Ptravel) + V_{lung}(p_{guess}, Ptravel)$$

with the following constraint added:

$$p_{guess} > Ptravel$$

providing a solution of:

$$ptravel(po, Vo, To, Tf, Ptravel) := \text{Find}(p_{guess})$$

The inputs to this function are the initial conditions together with travel pressure and temperature. The output of this function is the internal pressure.

The solution for a defined range of conditions can then be found:

$$p_{travel_{i,j}} := ptravel\left(p_{o_j}, V_{o_j}, T_{o_j}, T_f, P_{travel_i}\right)$$

$$Vlung_{travel_{i,j}} := Vlung\left(p_{travel_{i,j}}, P_{travel_i}\right)$$

$$Vamcltr_{travel_{i,j}} := AccumPresent \cdot V_{acmltr}\left(p_{travel_{i,j}}, P_{travel_i}\right)$$

$$\Delta P_{lung_{i,j}} := p_{travel_{i,j}} - P_{travel_i}$$

Figure 21:
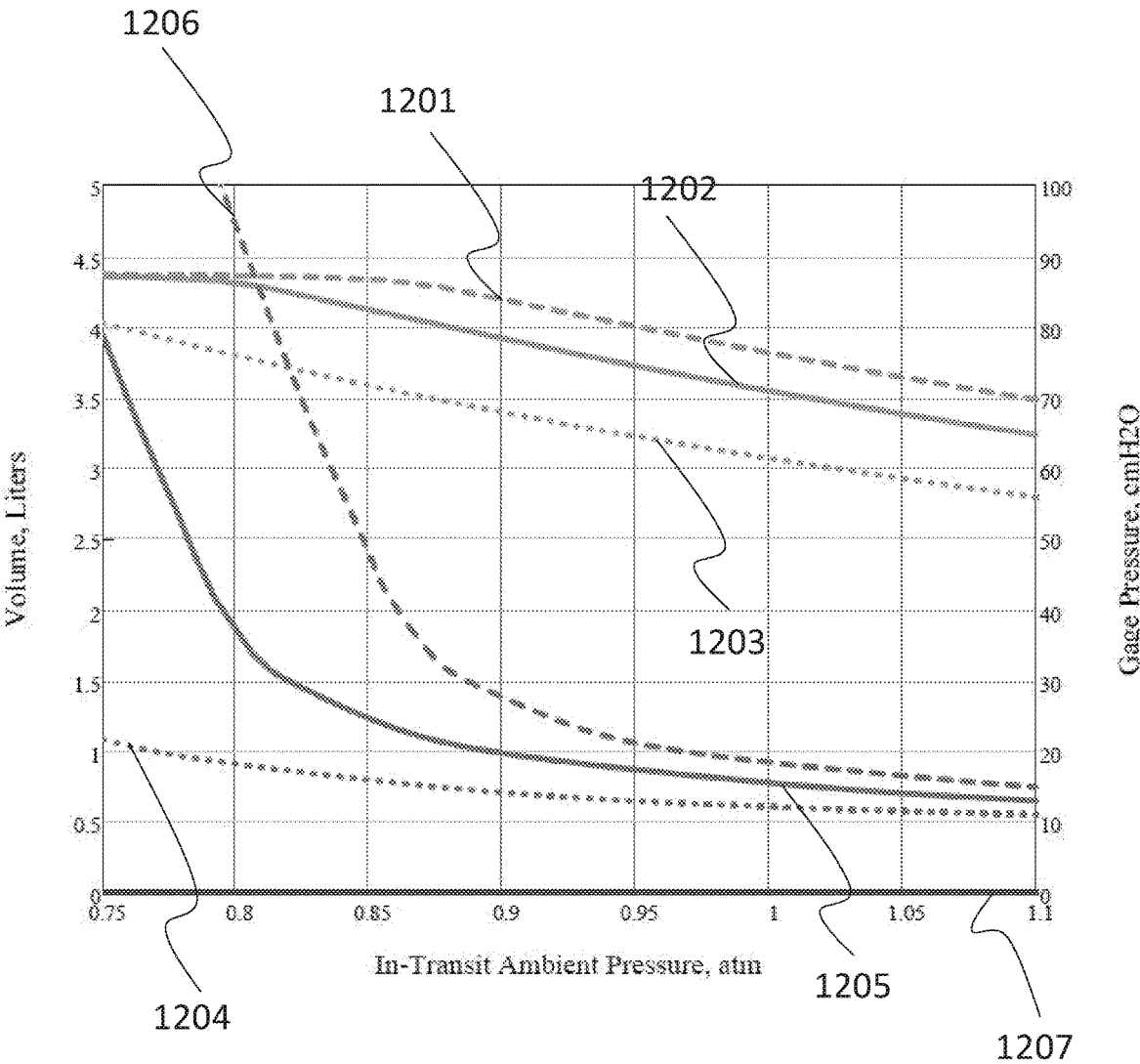
FIG. 21 shows lung pressure and volume across a range of ambient (atmospheric) pressures during transit without an accumulator based on various atmospheric pressures at recovery.
Figure 22:
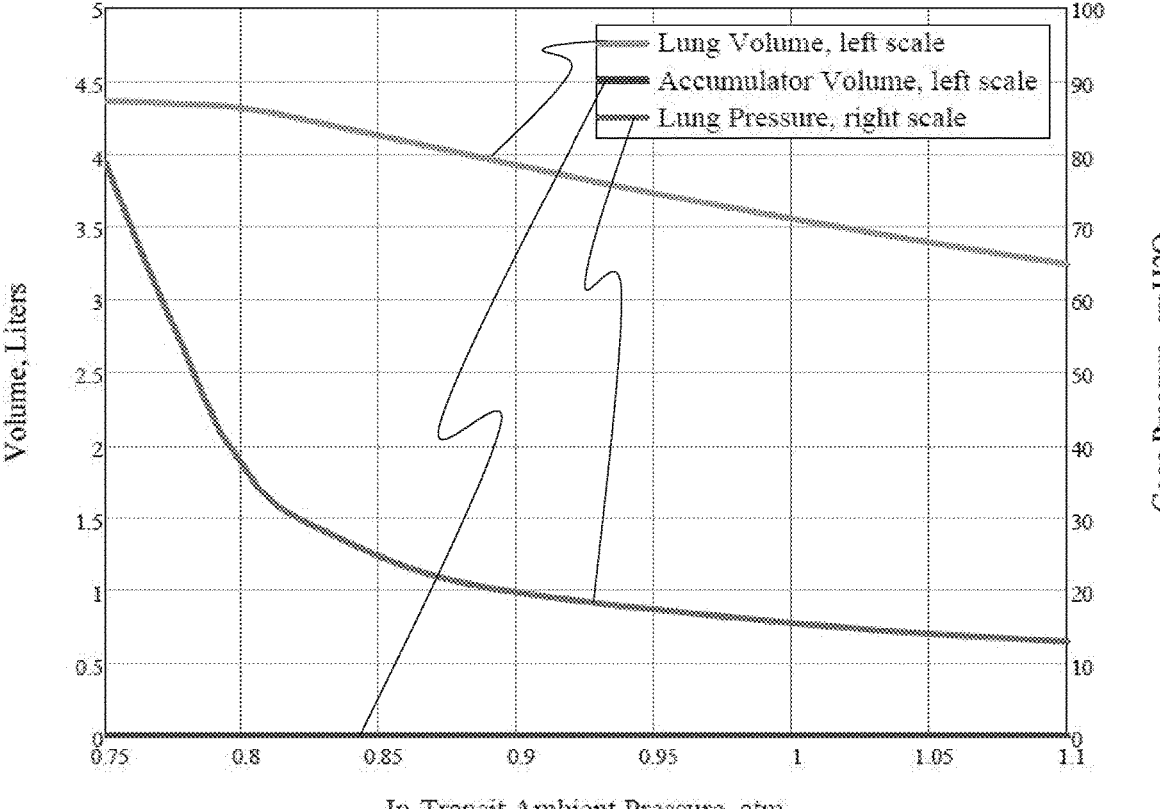
FIG. 22 shows lung pressure and volume across a range of ambient (atmospheric) pressures during transit without an accumulator with recovery at 1 atm.

FIGS. 21 and 22 show lung pressure and volume in no-accumulator systems given various parameters. Lung pressure and volume were plotted in FIG. 21 given the following:

Initial Conditions:

$$P_o = \begin{pmatrix} .86 \\ 1 \\ 1.08 \end{pmatrix} 1 \, atm \quad \begin{array}{l} \text{Atmospheric} \\ \text{Pressure at} \\ \text{Recovery} \end{array}$$

$$T_o \equiv \begin{pmatrix} 4 \\ 4 \\ 4 \end{pmatrix} °C. \quad \begin{array}{l} \text{Internal} \\ \text{Temperature at} \\ \text{Recovery} \end{array}$$

Lung Parameters:

$$Vlung_{max} \equiv 5 \, L \quad \text{limiting bag/box volume}$$

Accumulator Design Parameters:

$$AccumPresent \equiv 0 \qquad (0 = no \ accum.)$$

-continued $$Kacmltr \equiv 400 \cdot \frac{mL}{cm\ H2O}$$

Realistic spring ~ 400 mL/cm H2O

Weighted piston > 5000 mL/cm H2O

| | |
|---|---|
| $\Delta P_{amcltr} \equiv 15$ cm H2O | Recovery pressure |
| $Vacmnltr_{max} \equiv 1.5$ L | Maximum volume |
| $Vacmltr_{min} \equiv 50$ mL | Minimum volume |
| $Vacmltr_{recovery} \equiv \begin{pmatrix} 1000\ mL \\ 350\ mL \\ 50\ mL \end{pmatrix}$ | Accum. Volume as set by recovery team | in-Transit Temperature:

$$T_f = 8°\ C.$$

Figure 23:
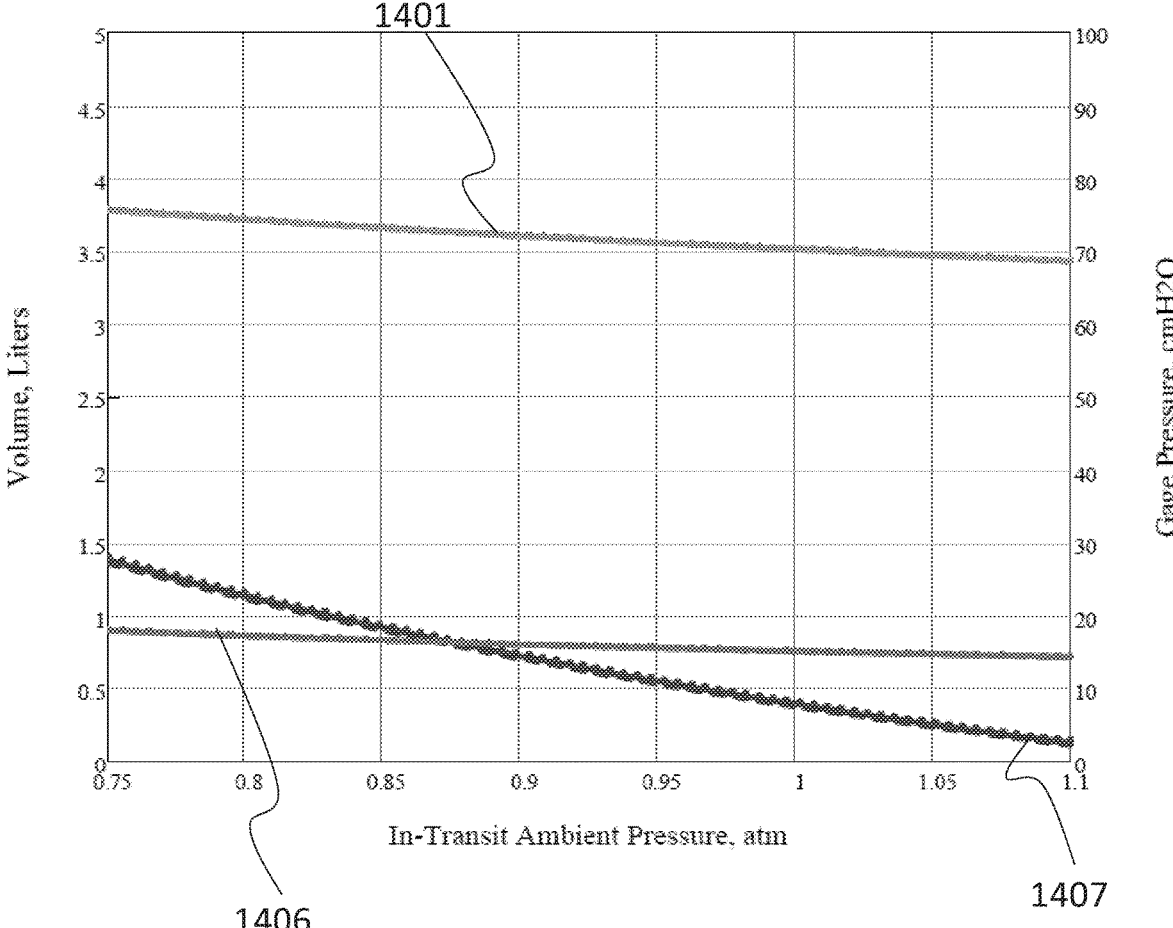
FIG. 23 shows lung pressure and volume across a range of ambient (atmospheric) pressures during transit with a spring-based accumulator based on various atmospheric pressures at recovery.
Figure 24:
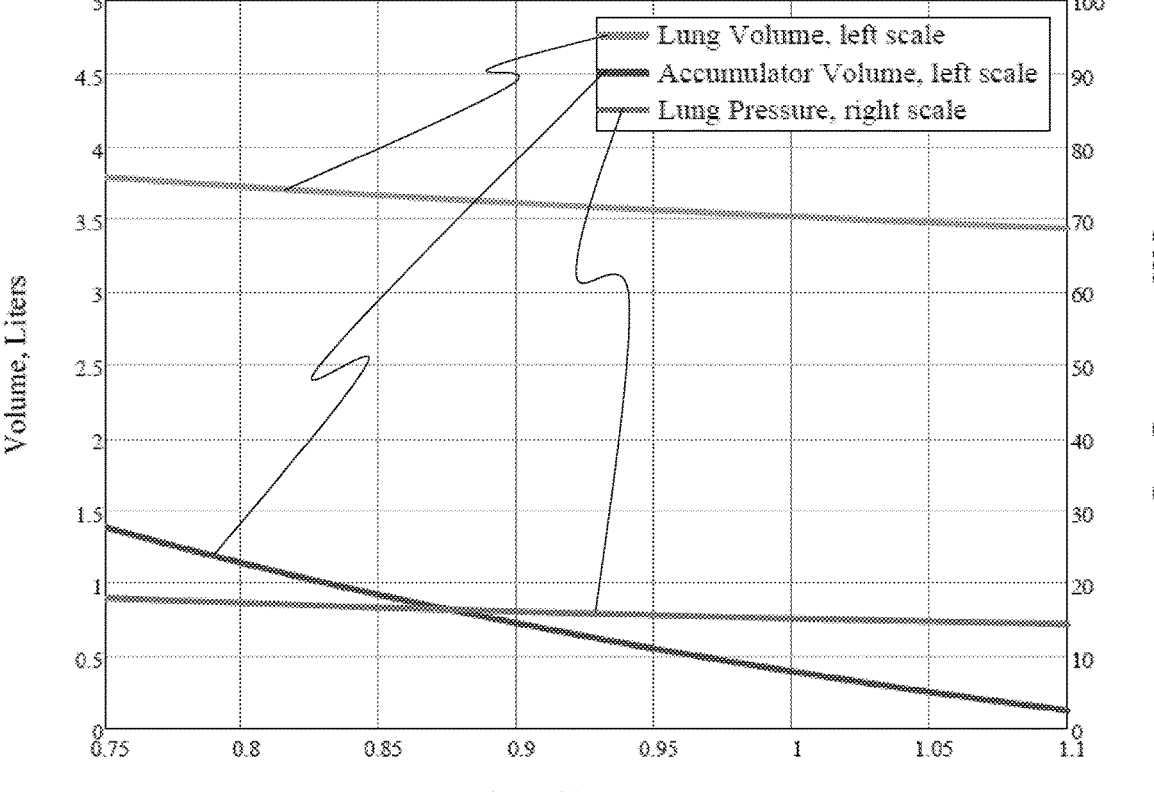
FIG. 24 shows lung pressure and volume across a range of ambient (atmospheric) pressures during transit with a spring-based accumulator with recovery at 1 atm.

Airplane Cabin Pressures:
  Regulatory Minimum=0.75 atm
  Older Airplanes=0.78 atm
  Newer Airplanes—0.80-0.83 atm
  Given the above values, FIG. 21 shows lung pressure and volume across a range of ambient (atmospheric) pressures during transit without an accumulator based on three different atmospheric pressures at recovery (0.86 atm, 1 atm, and 1.08 atm). Lung volume, recovery at 0.86 Patm 1201, lung volume, recovery at 1 Patm 1202, lung volume, recovery at 1.08 Patm 1203, and accumulator volume 1207 (set to zero here to represent a lack of accumulator) are plotted against the left hand scale. Lung pressure, recovery at 0.86 Patm 1204, lung pressure recovery at 1 Patm 1205, and lung pressure, recovery at 1.08 Patm 1206 are plotted against the right hand scale.
  FIG. 22 shows lung pressure and volume across a range of ambient (atmospheric) pressures during transit without an accumulator with recovery at 1 atm. The values are the same as given for the nominal (1 atm recovery pressure) plot in FIG. 21.
  As shown in FIGS. 21 and 22, the lung volume and pressure vary markedly in response to changes in the in-transit ambient pressure from airplane ascent and descent. These changes can cause damage to the lung tissue and negatively impact viability of the organ for transplant.
  FIGS. 23 and 24 show lung pressure and volume in spring-based accumulator systems given various parameters. Lung pressure and volume were plotted in FIG. 23 given the following:
Initial Conditions:

$$P_o = \begin{pmatrix} .86 \\ 1 \\ 1.08 \end{pmatrix} 1\ atm \quad \begin{matrix} \text{Atmospheric} \\ \text{Pressure at} \\ \text{Recovery} \end{matrix}$$

$$T_o \equiv \begin{pmatrix} 4 \\ 4 \\ 4 \end{pmatrix} °\ C. \quad \begin{matrix} \text{Internal} \\ \text{Temperature at} \\ \text{Recovery} \end{matrix}$$

Lung Parameters:

$$Vlung_{max} \equiv 5\ L \quad \text{limiting bag/box volume}$$

Accumulator Design Parameters:

| | |
|---|---|
| $AccumPresent \equiv 1$ | $(0 = no\ accum.)$ |

$$Kacmltr \equiv 350 \cdot \frac{mL}{cm\ H2O}$$

Realistic spring ~ 400 mL/cm H2O

Weighted piston > 5000 mL/cm H2O

| | |
|---|---|
| $\Delta P_{amcltr} \equiv 15$ cm H2O | Recovery pressure |
| $Vacmnltr_{max} \equiv 1.5$ L | Maximum volume |
| $Vacmltr_{min} \equiv 50$ mL | Minimum volume |
| $Vacmltr_{recovery} \equiv \begin{pmatrix} 1000\ mL \\ 350\ mL \\ 50\ mL \end{pmatrix}$ | Accum. Volume as set by recovery team |

Figure 25:
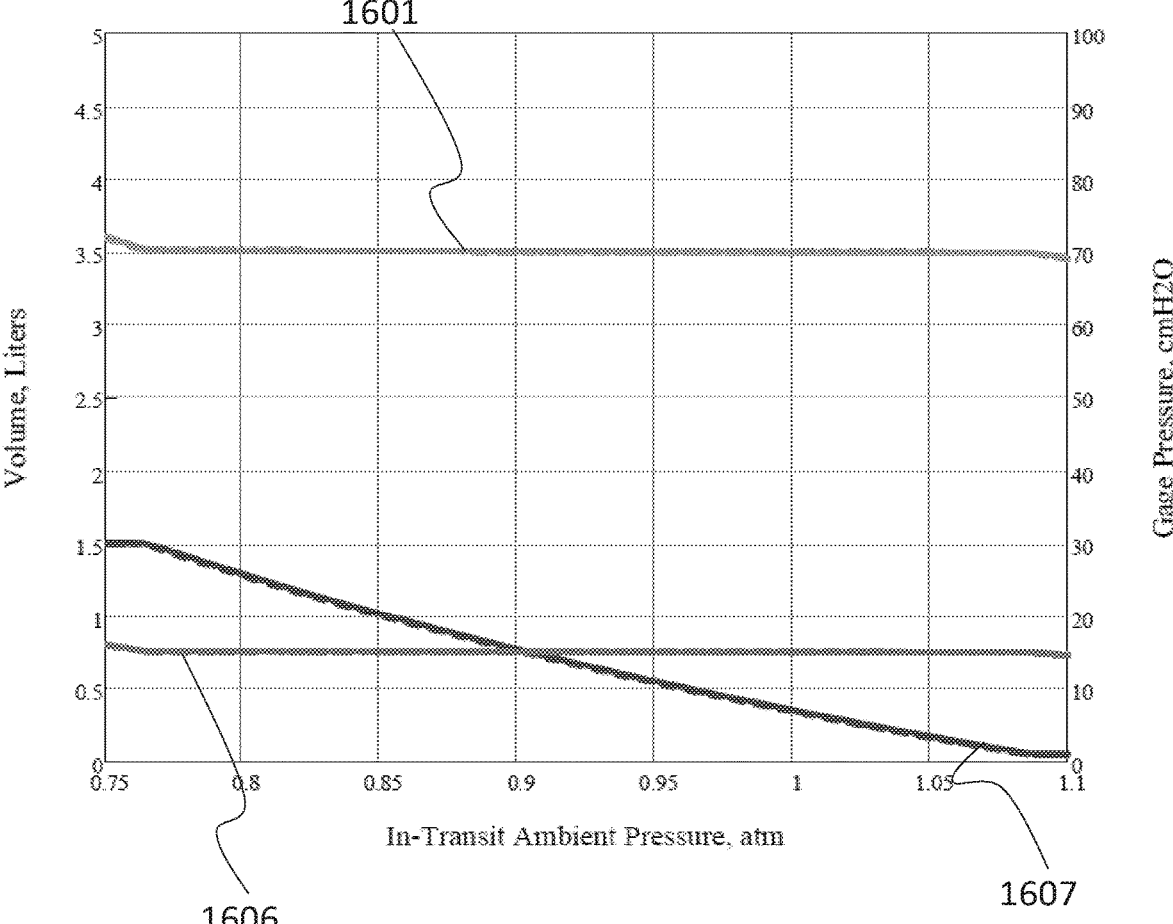
FIG. 25 shows lung pressure and volume across a range of ambient (atmospheric) pressures during transit with a weight-based accumulator based on various atmospheric pressures at recovery.
Figure 26:
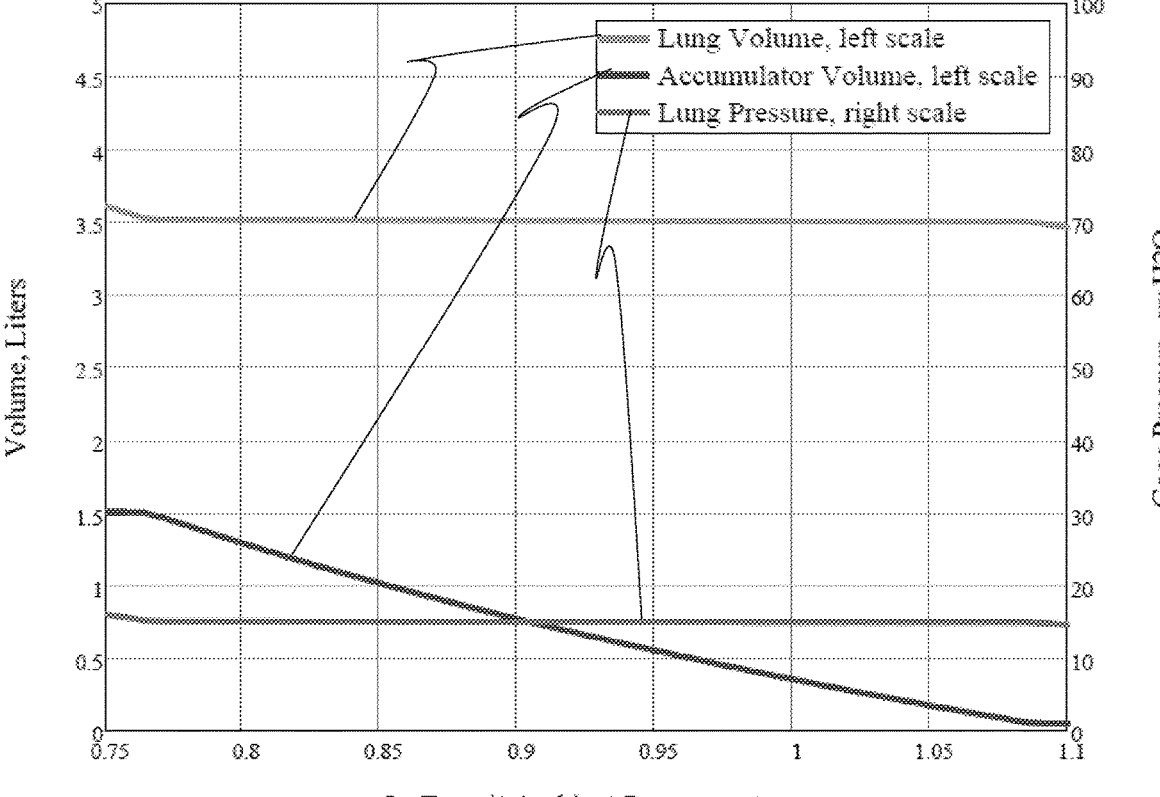
FIG. 26 shows lung pressure and volume across a range of ambient (atmospheric) pressures during transit with a weight-based accumulator with recovery at 1 atm.

Given the above values, FIG. 23 shows lung pressure and volume across a range of ambient (atmospheric) pressures during transit with a spring-based accumulator based on three different atmospheric pressures at recovery (0.86 atm, 1 atm, and 1.08 atm). Lung volume, recovery at 0.86 atm, 1 atm, and 1.08 atm 1401 and accumulator volume 1407 are plotted against the left hand scale. Lung pressure, recovery at 0.86 atm, 1 atm, and 1.08 atm 1406 are plotted against the right hand scale. Of note compared to FIG. 21, the lung volume, lung pressure, and accumulator volume curves are consistent across the various atmospheric pressure conditions at recovery because the accumulator volume set at the time of recover compensates for these differences. Furthermore, as shown in FIGS. 23-26, the lung volume and lung pressure curves are much flatter than those in FIGS. 21 and 22 (without an accumulator) while the accumulator volume changes to offset pressure differentials caused by changes in cabin pressure.
  FIG. 24 shows lung pressure and volume across a range of ambient (atmospheric) pressures during transit without an accumulator with recovery at 1 atm. The values are the same as given for the nominal (1 atm recovery pressure) plot in FIG. 23.
  FIGS. 25 and 26 show lung pressure and volume in weight-based accumulator systems given various parameters. Lung pressure and volume were plotted in FIG. 25 given the following:
Initial Conditions:

$$P_o = \begin{pmatrix} .86 \\ 1 \\ 1.08 \end{pmatrix} 1\ atm \quad \begin{matrix} \text{Atmospheric} \\ \text{Pressure at} \\ \text{Recovery} \end{matrix}$$

$$T_o \equiv \begin{pmatrix} 4 \\ 4 \\ 4 \end{pmatrix} °\ C. \quad \begin{matrix} \text{Internal} \\ \text{Temperature at} \\ \text{Recovery} \end{matrix}$$

Lung Parameters:

$$Vlung_{max} \equiv 5\ L \quad \text{limiting bag/box volume}$$

Accumulator Design Parameters:

$$Vlung_{max} \equiv 5\ L \quad \text{limiting bag/box volume}$$

Accumulator Design Parameters $AccumPresent \equiv 1$  (0 = no accum.)

$Kacmltr \equiv 350 \cdot \dfrac{mL}{cm\ H2O}$

Realistic spring ~ 400 mL/cm H2O

Weighted piston > 5000 mL/cm H2O $\Delta P_{amcltr} \equiv 15\ cm\ H2O$  Recovery pressure $Vacmnltr_{max} \equiv 1.5\ L$  Maximum volume $Vacmltr_{min} \equiv 50\ mL$  Minimum volume $Vacmltr_{recovery} \equiv \begin{pmatrix} 900\ mL \\ 300\ mL \\ 10\ mL \end{pmatrix}$  Accum. Volume as set by recovery team In-Transit Temperature:

$$T_f = 8° C.$$

Airplane Cabin Pressures:
  Regulatory Minimum=0.75 atm
  Older Airplanes=0.78 atm
  Newer Airplanes=0.80-0.83 atm
  Given the above values, FIG. 25 shows lung pressure and volume across a range of ambient (atmospheric) pressures during transit with a weight-based accumulator based on three different atmospheric pressures at recovery (0.86 atm, 1 atm, and 1.08 atm). Lung volume, recovery at 0.86 atm, 1 atm, and 1.08 atm 1601 and accumulator volume 1607 are plotted against the left hand scale. Lung pressure, recovery at 0.86 atm, 1 atm, and 1.08 atm 1606 are plotted against the right hand scale. As with FIG. 23, the lung volume, lung pressure, and accumulator volume curves are consistent across the various atmospheric pressure conditions at recovery because the accumulator volume, set at the time of recover compensates for these differences. The lung volume and pressure curves are slightly flatter than the spring-based accumulator curves in FIG. 23.
  FIG. 26 shows lung pressure and volume across a range of ambient (atmospheric) pressures during transit without an accumulator with recovery at 1 atm. The values are the same as given for the nominal (1 atm recovery pressure) case in the plot in FIG. 25.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:
  1. A system for storage of an organ, the system comprising:
  a transport container configured to receive an organ;
  a basket configured to be positioned in the transport container, the basket comprising a first support surface configured to support the organ;
  a shelf comprising a second support surface, the shelf configured to be suspended above the organ in the transport container, the shelf configured to receive a cooling material and maintain the cooling material proximate to and not in direct contact with the organ, the second support surface comprising a plurality of openings extending from an upper surface of the second support surface to a lower surface of the second support surface configured to promote heat transfer between the cooling material and the organ;
  a temperature probe configured to be positioned in the transport container;
  a temperature datalogger configured to be connected to the temperature probe; and
  a lid configured to seal with the transport container to form an insulated environment such that the cooling material is positioned between the second support surface of the shelf and the lid when the shelf is suspended in the transport container with the cooling material received by the shelf.
  2. The system of claim 1, wherein the shelf comprises walls on at least two sides of the shelf extending vertically from the second support surface, the walls extending between the second support surface and the lid when the lid is sealed with the transport container.
  3. The system of claim 2, wherein the second support surface of the shelf, the walls of the shelf, and the lid are configured to surround the cooling material.
  4. The system of claim 2, wherein the walls of the shelf extend vertically from the second support surface to form at least two walled sides of the shelf, and the shelf comprises a side that lacks walls, wherein the walled sides of the shelf are configured to prevent lateral movement of the cooling material and the side of the shelf that lacks walls is configured to allow lateral movement of the cooling material.
  5. The system of claim 1, further comprising the cooling material configured to be received by the shelf, wherein the cooling material is configured to maintain an in-transit temperature of at least 2° C.
  6. The system of claim 1, further comprising the cooling material configured to be received by the shelf, wherein the cooling material is configured to maintain an in-transit temperature of at least 8° C.
  7. The system of claim 1, further comprising the cooling material configured to be received by the shelf, wherein the cooling material is configured to maintain preservation solution contained in the transport container at a temperature between 0° C. and 12° C.
  8. The system of claim 1, further comprising the cooling material configured to be received by the shelf, wherein the cooling material is engineered to have a stable temperature between 2-10° C.
  9. The system of claim 1, further comprising the cooling material configured to be received by the shelf, wherein the cooling material is configured to maintain an in-transit temperature of approximately 10° C.

10. The system of claim 1, further comprising the cooling material configured to be received by the shelf, wherein the cooling material comprises pouches of phase change material, wherein the pouches of phase change material are configured to be stacked on the second support surface of the shelf.

11. The system of claim 1, further comprising three sterile bags configured to concentrically contain the organ.

12. The system of claim 1, wherein the transport container comprises a plurality of latches configured to secure to a plurality of protrusions of the lid.

13. The system of claim 1, wherein the temperature probe is configured to be positioned beneath the organ, and further comprising a flexible cable connecting the temperature probe to the temperature datalogger that extends through a wall of the transport container.

14. The system of claim 1, further comprising a handle and wheels disposed on a back wall of the transport container.

15. The system of claim 1, further comprising a display on the transport container, wherein the display is connected to the temperature datalogger and is configured to display a temperature within the transport container.

* * * * *